United States Patent [19]
Dhong et al.

[11] Patent Number: 5,959,656
[45] Date of Patent: Sep. 28, 1999

[54] METHOD AND APPARATUS FOR ENHANCING LASER PRINTER RESOLUTION BY USING A LASER BEAM MODULATION TECHNIQUE

[75] Inventors: Yong-bae Dhong, Kyungki-do; Soo-won Kim; Min-su Jeong, both of Seongbuk-gu; Jin-tae Kim, Seoul, all of Rep. of Korea

[73] Assignee: Korea Electronics Technology Institute, Pyungtaek, Rep. of Korea

[21] Appl. No.: 08/764,469

[22] Filed: Dec. 12, 1996

Related U.S. Application Data

[63] Continuation-in-part of application No. 08/495,806, Jun. 27, 1995, Pat. No. 5,712,675.

[30] Foreign Application Priority Data

May 15, 1995 [KR] Rep. of Korea ..................... 95-11977

[51] Int. Cl.⁶ .......................................................... B41J 2/47
[52] U.S. Cl. ........................................... 347/254; 347/131
[58] Field of Search ..................................... 347/254, 251, 347/240, 131; 358/298, 459; 399/180, 181; 395/109, 110; 382/269; 348/625

[56] References Cited

U.S. PATENT DOCUMENTS

| | | |
|---|---|---|
| 4,724,446 | 2/1988 | Hirahara et al. . |
| 4,771,471 | 9/1988 | Kitamura ................................. 382/269 |
| 4,878,068 | 10/1989 | Suzuki . |
| 4,933,689 | 6/1990 | Yoknis ..................................... 347/131 |
| 5,134,495 | 7/1992 | Frazier et al. . |
| 5,325,160 | 6/1994 | Imakawa et al. . |
| 5,461,702 | 10/1995 | Inoue . |
| 5,574,832 | 11/1996 | Towery et al. . |
| 5,574,833 | 11/1996 | Yoshiaki . |
| 5,586,225 | 12/1996 | Onizuka et al. . |
| 5,646,670 | 7/1997 | Seto et al. ................................ 347/254 |
| 5,684,933 | 11/1997 | Nagafusa ................................. 395/109 |
| 5,712,675 | 1/1998 | Dhong et al. ............................ 347/254 |

FOREIGN PATENT DOCUMENTS 92-323959 of 1992 Japan .

*Primary Examiner*—N. Le
*Assistant Examiner*—L. Anderson
*Attorney, Agent, or Firm*—Robert E. Bushnell, Esq.

[57] ABSTRACT

A resolution enhancement apparatus and method of a laser printer using a modulated laser beam is adapted to an image forming apparatus of the laser printer, and includes a memory for storing sequentially input image data in a sequential scanning method, rearranging a scanning line order and generating an M×M sample window, M being an integer, a first processor for producing $(M-2)^2$ 3×3 sample windows using the M×M sample window, determining which mask pattern among a plurality of mask patterns is coincident with each of the produced 3×3 sample windows, and outputting predetermined data with respect to direction and density of the image data according to the mask pattern, a second processor for determining to which group among a plurality of groups the image data belongs by using the predetermined data output from the first processor, and altering the image data into predetermined image data corresponding to the group to output the altered data, and a signal modulator for modulating the data output from said second processor into a predetermined pattern and outputting the modulated pattern, thereby minimizing the use of memory space by using four row line memories and enhancing resolution by expressing finite shapes according to nineteen modulation patterns while eliminating the more severe portions of pixel magnitude variation (step phenomenon).

43 Claims, 32 Drawing Sheets

|   | 1 | 2 | 3 | 4 | 5 | 6 | 7 |
|---|---|---|---|---|---|---|---|
| A |   |   | A3 | A4 | A5 |   |   |
| B |   | B2 | B3 | B4 | B5 | B6 |   |
| C | C1 | C2 | C3 | C4 | C5 | C6 | C7 |
| D | D1 | D2 | D3 | D4 | D5 | D6 | D7 |
| E | E1 | E2 | E3 | E4 | E5 | E6 | E7 |
| F |   | F2 | F3 | F4 | F5 | F6 |   |
| G |   |   | G3 | G4 | G5 |   |   |

BLACK

L2

R2

UP2
DN2
(UP2,DN2)

WHITE

| p[0][0] | p[0][1] | p[0][2] | p[0][3] | p[0][4] |
|---|---|---|---|---|
| p[1][0] | p[1][1] | p[1][2] | p[1][3] | p[1][4] |
| p[2][0] | p[2][1] | p[2][2] | p[2][3] | p[2][4] |
| p[3][0] | p[3][1] | p[3][2] | p[3][3] | p[3][4] |
| p[4][0] | p[4][1] | p[4][2] | p[4][3] | p[4][4] |

FIG. 12B

| p[j-1][i-1] | p[j-1][i] | p[j-1][i+1] |
|---|---|---|
| p[j][i-1] | p[j][i] | p[j][i+1] |
| p[j+1][i-1] | p[j+1][i] | p[j+1][i+1] |

FIG. 13

| MASK1 | MASK2 | MASK3 | MASK4 | MASK5 |
|---|---|---|---|---|
| X 0 X / 1 0 1 / 1 1 1 | X 1 1 / 0 0 1 / X 1 1 | 1 1 1 / 1 0 1 / X 0 X | 1 1 X / 1 0 0 / 1 1 X | X 0 1 / 0 0 1 / 0 1 1 |

| MASK6 | MASK7 | MASK8 | MASK9 | MASK10 |
|---|---|---|---|---|
| X 0 0 / 0 0 1 / 1 1 1 | 0 1 1 / 0 0 1 / X 0 1 | 1 1 1 / 0 0 1 / X 0 0 | 1 1 0 / 1 0 0 / 1 0 X | 1 1 1 / 1 0 0 / 0 0 X |

| MASK11 | MASK12 | MASK13 | MASK14 | MASK15 |
|---|---|---|---|---|
| 0 0 X / 1 0 0 / 1 1 1 | 1 0 X / 1 0 0 / 1 1 0 | X 0 0 / 0 0 1 / 0 1 X | 0 1 X / 0 0 1 / X 0 0 | X 1 0 / 1 0 0 / 0 0 X |

| MASK16 | MASK17 | MASK18 | MASK19 | MASK20 |
|---|---|---|---|---|
| 0 0 X / 1 0 0 / X 1 0 | X 0 1 / 0 1 1 / 0 1 1 | X 0 0 / 0 1 1 / 1 1 1 | 0 1 1 / 0 1 1 / X 0 1 | 1 1 1 / 0 1 1 / X 0 0 |

| MASK21 | MASK22 | MASK23 | MASK24 | MASK25 |
|---|---|---|---|---|
| 1 1 0 / 1 1 0 / 1 0 X | 1 1 1 / 1 1 0 / 0 0 X | 0 0 X / 1 1 0 / 1 1 1 | 1 0 X / 1 1 0 / 1 1 0 | 1 0 X / 1 0 0 / 1 1 1 |

| MASK26 | MASK27 | MASK28 | MASK29 | MASK30 |
|---|---|---|---|---|
| X 0 1 / 0 0 1 / 1 1 1 | 1 1 1 / 0 0 1 / X 0 1 | 1 1 1 / 1 0 0 / 1 0 X | 0 0 0 / 0 1 1 / 0 1 X | 0 0 0 / 1 1 0 / X 1 0 |

| MASK31 | MASK32 | MASK33 | MASK34 | MASK35 |
|---|---|---|---|---|
| 0 1 X / 0 1 1 / 0 0 0 | X 1 0 / 1 1 0 / 0 0 0 | 0 1 X / 0 1 X / 0 1 X | 0 0 0 / 1 1 1 / X X X | X X X / 1 1 1 / 0 0 0 |

| MASK36 | MASK37 | MASK38 | MASK39 | MASK40 |
|---|---|---|---|---|
| X 1 0 / X 1 0 / X 1 0 | 1 0 X / 1 0 X / 1 0 X | 1 1 1 / 0 0 0 / X X X | X X X / 0 0 0 / 1 1 1 | X 0 1 / X 0 1 / X 0 1 |

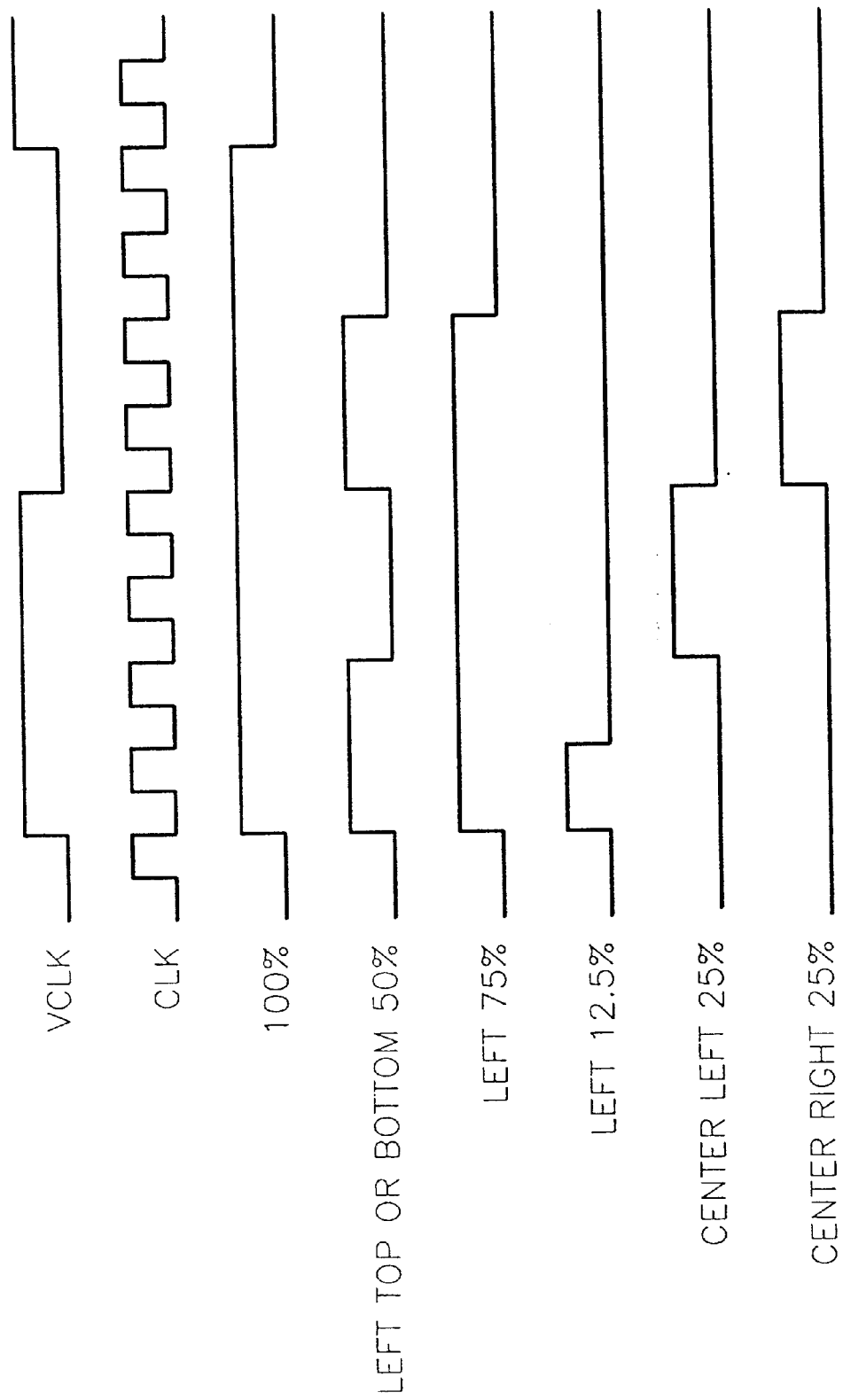

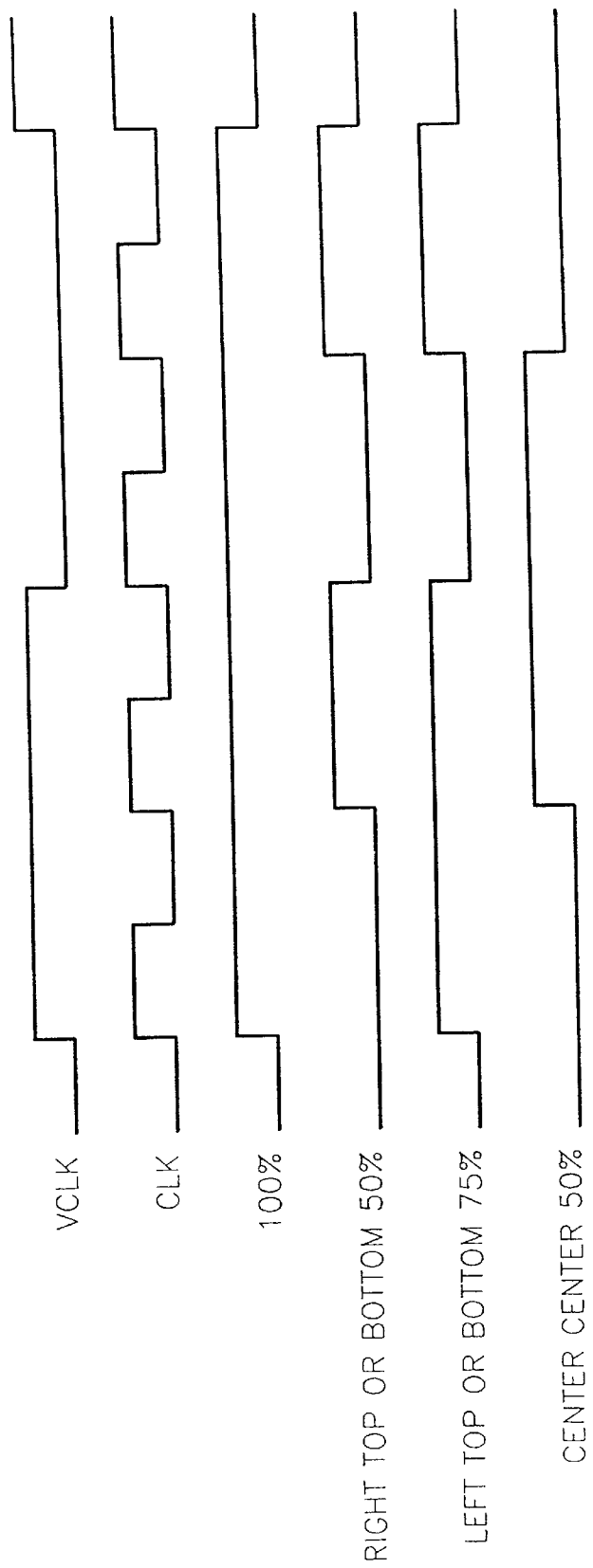

METHOD AND APPARATUS FOR ENHANCING LASER PRINTER RESOLUTION BY USING A LASER BEAM MODULATION TECHNIQUE

CROSS-REFERENCE TO RELATED APPLICATIONS

This application is a continuation-in-part and claims all benefits accruing under 35 U.S.C. §120 from U.S. patent application Ser. No. 08/495,806, filed in the U.S. Patent & Trademark Office on Jun. 27, 1995, now U.S. Pat. No. 5,712,675.

CLAIM OF PRIORITY

This application makes reference to, incorporates the same herein, and claims all benefits accruing under 35 U.S.C. §119 from an application for METHOD AND APPARATUS FOR ENHANCING LASER PRINTER RESOLUTION earlier filed in the Korean Industrial Property Office on the 15th of May 1995 and there duly assigned Ser. No. 11977/1995, and an application for METHOD AND APPARATUS FOR ENHANCING LASER PRINTER RESOLUTION earlier filed in the Korean Industrial Property Office on the 8th of May 1996 and there duly assigned Ser. No. 15053/1996.

BACKGROUND OF THE INVENTION

The present invention relates to an image formation apparatus for a laser printer, and more particularly, to a method and apparatus for enhancing the resolution of a laser printer by using a laser beam modulation technique.

Generally, in a laser printer, a laser beam is driven according to an input image, a drum is electrically charged, and toner (being oppositely charged) is adhered to the drum. The drum-adhered toner is then transferred onto a sheet of paper by heating, to thus produce (print) an output image corresponding to the input image. Here, the signal used for driving the laser beam is in the form of an image bitmap signal.

To enhance resolution in such a laser printer, that is, to print an image with greater precision and fineness, one or more requirements must be met. That is, the capacity of a buffer memory should be increased, the powder of the toner should be very fine, and/or an electromagnetic process of the optical drum should be improved for smooth operation in high-resolution conditions, all of which, however, result in cost increases since an expensive high-resolution engine and large memory capacity are required.

An image formation apparatus which can increase resolution in the laser printer using a laser beam modulation technique without the need for a larger capacity memory or high-resolution engine, is disclosed in Japanese Patent Laid-open Publication No. 92-323959 (Matsushida), as shown in FIG. 1. Here, a laser beam modulation technique controls the quantity and position of an electrical charge on the drum, by varying the shape of a pulse of a laser beam driver according to an image pattern. Since the amount and position of the drum-adhered toner can be precisely determined by variation of the electrical charges, such a technique can ultimately increase the resolution of the laser printer.

Referring to FIG. 1, the conventional image formation apparatus is composed of a memory portion 110, an edge detector 120, a weight processor 130, a logic operator 140, a correction controller 150, a signal generator 160, and an edge data selector 170.

The FIG. 1 apparatus shows a technology for determining an image pattern from 7×7 window information (refer to FIG. 6) and processing the determined image pattern. To briefly explain an algorithm for determining an image pattern, a weight value is assigned to an edge in the weight value processor 130 when a specific portion in FIG. 6 is determined as an edge. Then, the assigned weight values are summed in the logic operator 140, the result being compared with a number representing a predetermined reference pattern to determine a modulation pattern which will ultimately be printed. Then, the correction controller 150 outputs a correction control signal of the image data and the signal generator 160 produces a modulation signal according to the correction control signal.

In more detail, the memory portion 110 produces a bitmap data window for processing a signal and is composed of a 7-row, 4,096-column bit memory circuit 111, a sample window generator 112 and a memory controller 113. The memory circuit 111 is a first-in-first-out (FIFO) memory composed of 7-row shift registers and 4,096-column flip-flops, and the sample window generator 112 produces sample window data of FIG. 6 using the data from the memory circuit 111. Meanwhile, the memory controller 113 controls the memory circuit 111 to enable an input video data to be sequentially stored therein and outputs a pixel clock for external circuitry synchronization. Here, the horizontal synchronization (Hsync) signal is also supplied from a laser printer controller (not shown).

In the operation of the memory portion 110, first, the input video data is sequentially stored in the memory circuit 111, per each bit, starting from the seventh row. Whenever one bit is stored in the memory portion 110, the value of a counter in memory controller 113 increases by one. When the counter value reaches the number of dots corresponding to the printed width of the paper, the data in the seventh row is shifted to the sixth row and the counter is reset to zero so that the input video data can again be stored in the seventh row. When the seventh row again becomes full, the data therein is shifted to the sixth row and the data in the sixth row is shifted to the fifth row. In this manner, the lastly input data is always stored in the seventh row, with the previously input data being sequentially stored in the other rows in the same manner on down to the first row. Thus, the sample window generator 112 produces a sample window as shown in FIG. 6, from the seven rows of memory circuit 111. Here, assuming that D4 (Dth row, fourth column) is the current position of a pixel to be processed in memory circuit 111, the sample window generator 112 reads out the third through fifth columns in the Ath and Gth rows, the second through sixth columns in the Bth and Fth rows, and the first through seventh columns in the Cth, Dth and Eth rows, to produce a 7×7 sample window.

Figures 2, 3:
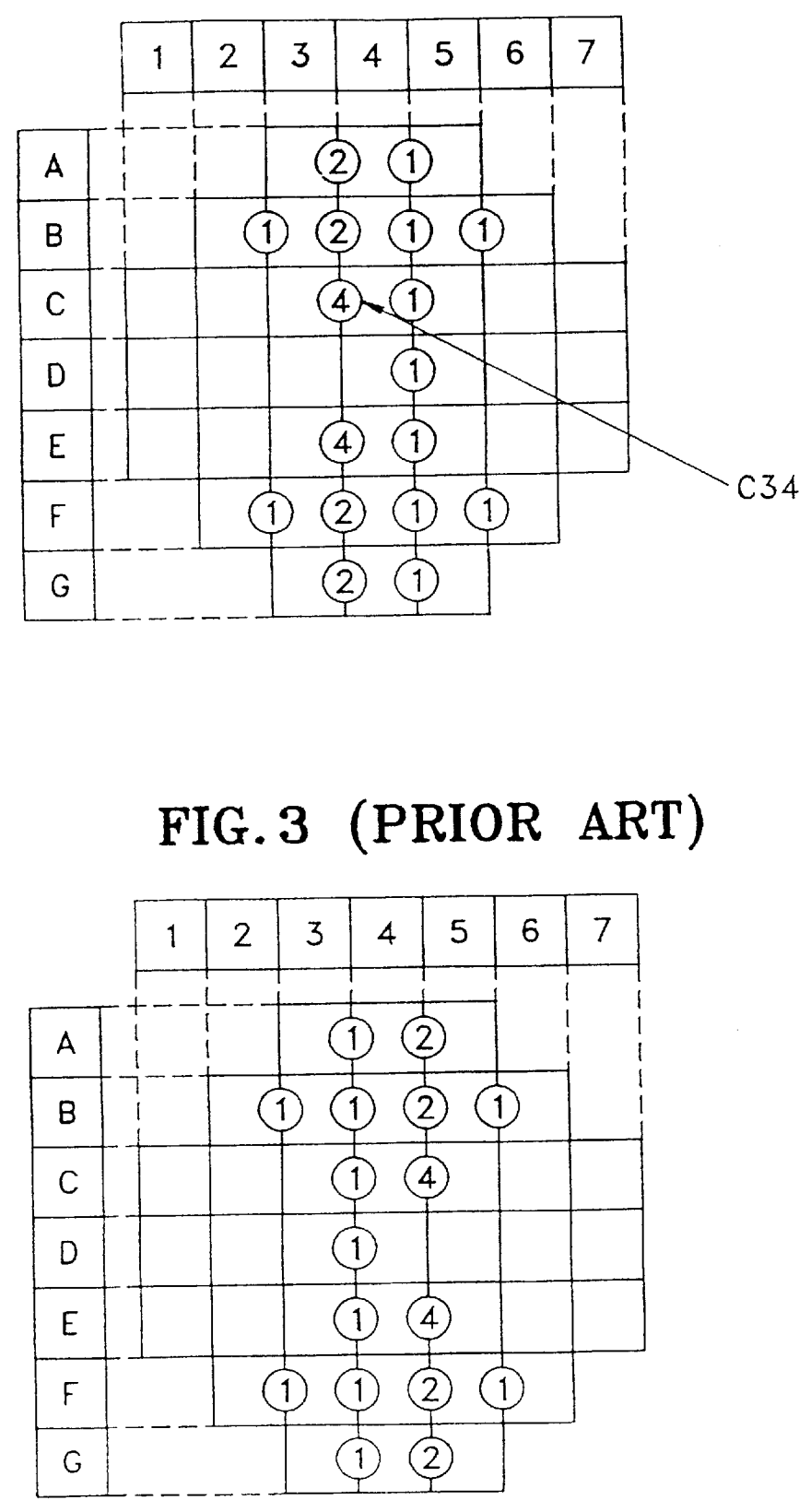
Figures 4, 5:
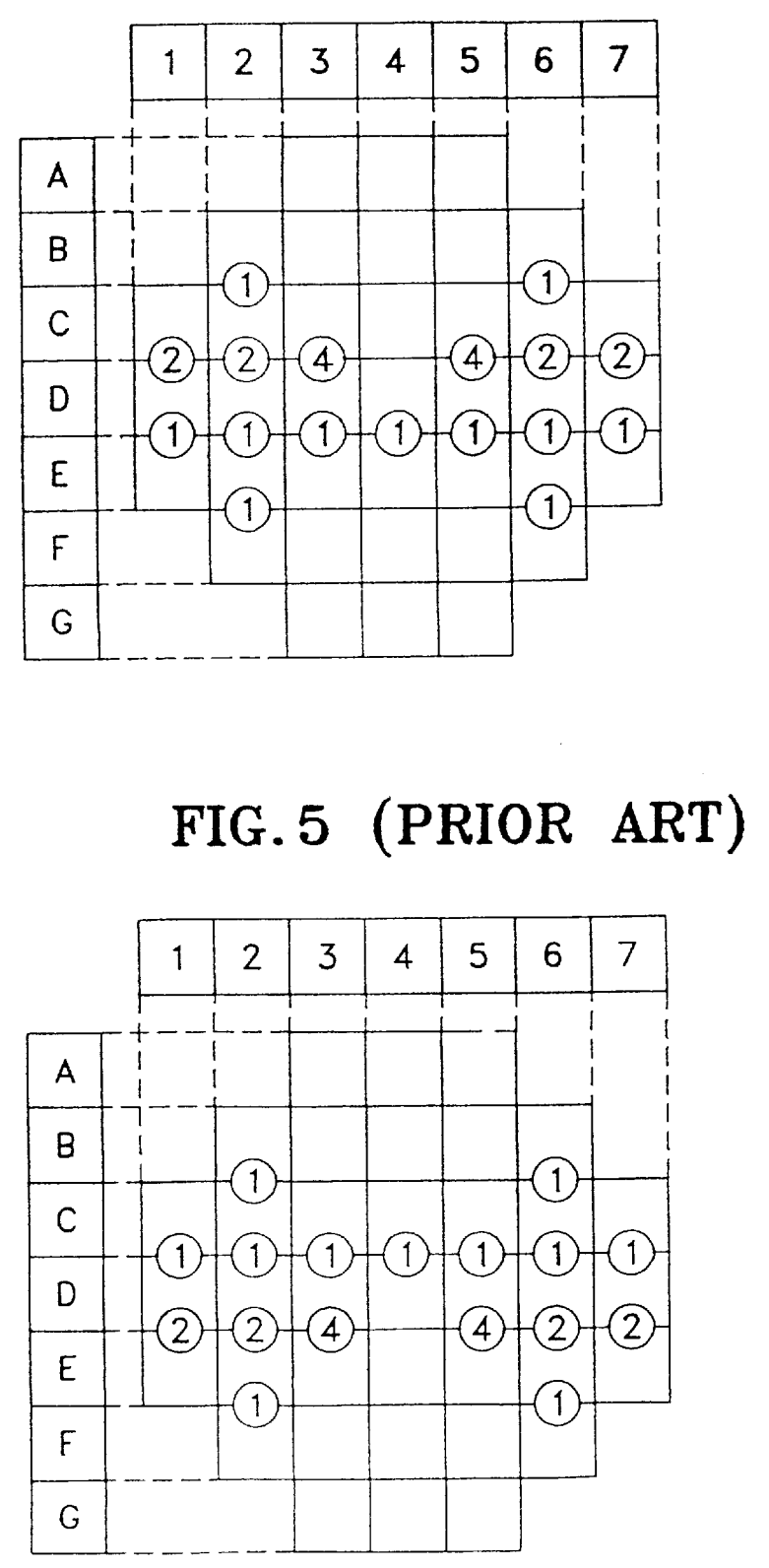

FIGS. 2–5 show image patterns for right- left- bottom- and top-edge detection in the edge detector of FIG. 1, respectively. Here, each circle represents an edge and has an assigned weight value of 1, 2 or 4. The edge detector 120 detects an intermediate portion (edge) between pixels when the bitmap data of two adjacent pixels differ, i.e., detects whether a circle location shown in FIGS. 2–5 is an edge. Edge detection is classified as one of four different types (left-, right-, top- and bottom-edge) according to the relationship between the current pixel (i.e., D4) and its periphery pixels, and is controlled by the edge data selector 170 which selects one kind of edge detection, to thereby determine the direction, i.e., left (L), right (R), up (UP) or down (DN), of the edge.

Once a circled portion (pixel boundary) is detected as an edge by the edge detector 120, the weight value processor 130 assigns the weight values of each circle shown in FIGS. 2–5.

The logic operator 140 sums the edges to which the weight values are assigned, compares the summed result with a predetermined value, determines a modulation pattern, and outputs data to be corrected based on the modulation pattern.

The correction controller 150 outputs a correction control signal for controlling the correction of image data D4 according to the correction data output from the logic operator 140.

The signal generator 160 produces a modulation signal to be supplied to a laser driver (not shown) according to the correction control signal output from the correction controller 150.

The edge data selector 170 determines one edge detection pattern among the edge detection patterns shown in FIGS. 2–5, according to the relationship between a pixel currently being processed, that is, D4 of FIG. 6 and the periphery pixels, as described above. The edge pattern of D4 is classified with a left-central edge, a right-central edge, an upper-central edge and a lower-central edge. With respect to the following cases, edge detection patterns are selected as shown in FIGS. 2–5. That is, when the D4[bitmap] is not equal to the D5[bitmap], the right-central edge pattern is selected; when the D4[bitmap] is not equal to the D3[bitmap], the left-central edge pattern is selected; when the D4[bitmap] is not equal to the E4[bitmap], the lower-central edge pattern is selected; and when the D4[bitmap] is not equal to the C4[bitmap], the upper-central edge pattern is selected.

As described above, the respective forms of edge detection designate a pixel boundary as an edge when the bitmap values of either of the pixel differ from the other. For example, the circle (pixel boundary) between C3 and C4 in FIG. 2 is designated as an edge when C3 and C4 have different bitmap data values, and thus, C34 is an edge when the C3[bitmap] is not equal to the C4[bitmap]. Further, each detected edge has a weight value (the numerical figure within the circle) according to each edge detection pattern, which is processed in the weight value processor 130. For example, in FIG. 2, if C34 is an edge, a weight value (in this case, "4") is placed in the circle C34, and a "0" is placed therein if it is not an edge.

The logic operator 140 sums the weight values which have been assigned by the weight value processor 130, compares the summed result with predetermined values and determines a modulation pattern. The comparison is accomplished with various predetermined values, upon the result of which one modulation pattern is determined among the eight patterns of FIGS. 7A–7H, wherein a modulation pattern may be classified as a black-pixel type (FIGS. 7A–7D) or a white-pixel type (FIGS. 7E–7H). Thus, there are eight such modulation patterns: (FIG. 7A) when a laser drive signal is given for a certain pixel; (FIG. 7B) when a laser drive signal is given for the left-side two-thirds portion of a certain pixel; (FIG. 7C) when a laser drive signal is given for the right-side two-thirds portion of a certain pixel; (FIG. 7D) when a laser drive signal is given for the central two-thirds portion of a certain pixel; (FIG. 7E) when a laser drive signal is not given for a certain pixel; (FIG. 7F) when a laser drive signal is given for the left-side one-third portion of a certain pixel; (FIG. 7G) when a laser drive signal is given for the right-side one-third portion of a certain pixel; and (FIG. 7H) when a laser drive signal is given for the central one-third portion of a certain pixel. As shown in FIGS. 7A–7H, there are ten actual dot patterns owing to the up-direction and down-direction pixel arrangements, since a pixel modulation pattern has both up-direction and down-direction modulation patterns when the laser drive signal is given for the central portion of the pixel.

The correction controller 150 performs a correction operation according to the modulation pattern determined in the logic operator 140. Then, the signal generator 160 sends a modulation signal to a laser beam printer engine 860 of FIG. 8. The signal generator 160 has the eight modulation patterns of FIGS. 7A–7H, i.e., six modulation patterns and the 100% and 0% conditions. Either FIG. 7D or 7H represents the position of the output pixel when a modulation result of the pixel is determined as an up or down form. When a current laser printer represents the result of the up or down form, an electrostatic phenomenon of the toner is used, wherein the toner is automatically moved up when there is an upper dot and moved down when there is a lower dot, by an electrostatic force. In FIG. 7D, the modulation pattern (UP2, DN2) is made by just one modulation signal. Here, if a pixel which is located above the current pixel is a 100% black pixel, the modulation pattern becomes an up-direction modulation pattern UP2, while if a pixel which is located below the current pixel is a 100% black pixel, the modulation pattern becomes a down-direction modulation pattern DN2. The modulation pattern of FIG. 7H (UP1, DN1) is created in the same manner.

In the above-described conventional art, the seven 4,096-bit lines use a total of 28,672 bits for A4-sized paper, with a larger memory capacity being needed when A3-sized paper is used. Accordingly, when a corresponding memory is realized in a single chip, the total size of the whole chip becomes large due to the size of the memory. Also, besides the 100% and 0% conditions, the conventional technology is limited to just six possible modulation methods. Thus, various kinds of dot patterns cannot be adapted to accomplish a desired resolution increase.

In U.S. Pat. No. 4,933,689 issued on Jun. 12, 1990 as another form of the conventional art, the number of dots capable of being represented per inch is not increased, but a technology of bringing a high-resolution effect by minutely adjusting the thickness and position of a dot is disclosed. Here, a clock pulse is modulated to adjust an interval and intensity of a laser beam and to then obtain a particular dot pattern. The dot pattern is then matched against a prestored set of data on a real-time basis, to adjust the center position of a dot in the horizontal direction by thirds and fix the dot size in the vertical direction. Accordingly, a curved surface and linear component of the character can be smoothened to reduce a step phenomenon. However, only the curved surface can be smoothened and such problems as position error and shape distortion cannot be solved.

A double scanning line method as yet another form of the conventional art suppresses the need to increase memory size by using a data compression technique for enhancing horizontal and vertical resolution by two times or more. However, this method has a drawback in that linear lines differ from each other in thickness and vertical resolution cannot be improved by no more than two times.

SUMMARY OF THE INVENTION

To solve the above problems, it is an object of the present invention to provide a resolution enhancement apparatus in a laser printer capable of minimizing the use of a memory and reducing production costs.

It is another object of the present invention to provide an apparatus for enhancing vertical and horizontal resolution in a laser printer by minutely expressing a pixel according to a laser beam modulation pattern.

It is still another object of the present invention to provide a resolution enhancement apparatus in a laser printer for enhancing resolution more than two times by removing any portion having a severe variation of pixel magnitude.

It is yet another object of the present invention to provide a resolution enhancing apparatus in a laser printer which can reduce toner consumption by adopting a toner-saving mode when determining a modulation pattern of pixel data and by selecting and outputting a thickness mode according to the determined modulation pattern.

It is a further object of the present invention to provide a resolution enhancing apparatus in a laser printer, for increasing input bitmap data horizontally and vertically by two times and increasing the pattern of a dot by four times.

It is still a further object of the present invention to provide a resolution enhancement method in a laser printer which is adapted to a resolution enhancement apparatus in the laser printer.

To accomplish one or more of the above objects according to one aspect of the present invention, there is provided a resolution enhancement apparatus of a laser printer which reads stored image data and modulates the read image data, the apparatus comprising: memory means for storing sequentially input image data in a sequential scanning method, rearranging a scanning line order and generating an M×M sample window, M being an integer; first processing means for classifying and outputting patterns of the image data according to bitmap information in a sample window using $(M-2)^2$ 3×3 masks produced from the M×M sample window supplied from the memory means; second processing means for classifying the data output from the first processing means into a plurality of groups by using pixel density and outputting the classified group data; and signal modulation means for modulating the data output from the second processing means into a predetermined pattern and outputting the modulated pattern.

Another aspect of the present invention can be accomplished by providing a resolution enhancement method of a laser printer which reads image data in a memory and modulates the read image data under the control of a controller, the method comprising the steps of: storing sequentially input image data in a sequential scanning method, rearranging a scanning line order and generating an M×M sample window, M being an integer; firstly processing by classifying and outputting a pattern of the image data according to bitmap information in a pixel using $(M-2)^2$ 3×3 masks produced from the M×M sample window supplied from the memory; secondly processing by using pixel density to classify data output from the first processing step into a plurality of groups and outputting the classified group data; and modulating data output from the second processing step into a predetermined pattern and outputting the modulated pattern.

BRIEF DESCRIPTION OF THE DRAWINGS

Further features and advantages of the present invention will become more apparent from the following description, reference being made to accompanying drawings wherein a preferred embodiment of present invention is clearly shown.

In the drawings:

FIGS. 2–5 show image patterns for right-, left-, bottom- and top-edge detections in the edge detector of FIG. 1, respectively;

FIG. 6 shows a sample window in the sample window generator of FIG. 1;

FIGS. 12A and 12B show sample windows of the memory portion and the first processor of FIG. 9, respectively;

FIG. 13 shows a mask pattern diagram to be compared with a given pixel pattern in the first processor of FIG. 9;

FIGS. 29A and 29B show output waveform diagrams of the signal modulator shown in FIG. 9, in the "8" and "4" modes, respectively;

DETAILED DESCRIPTION OF THE INVENTION

Figure 1:
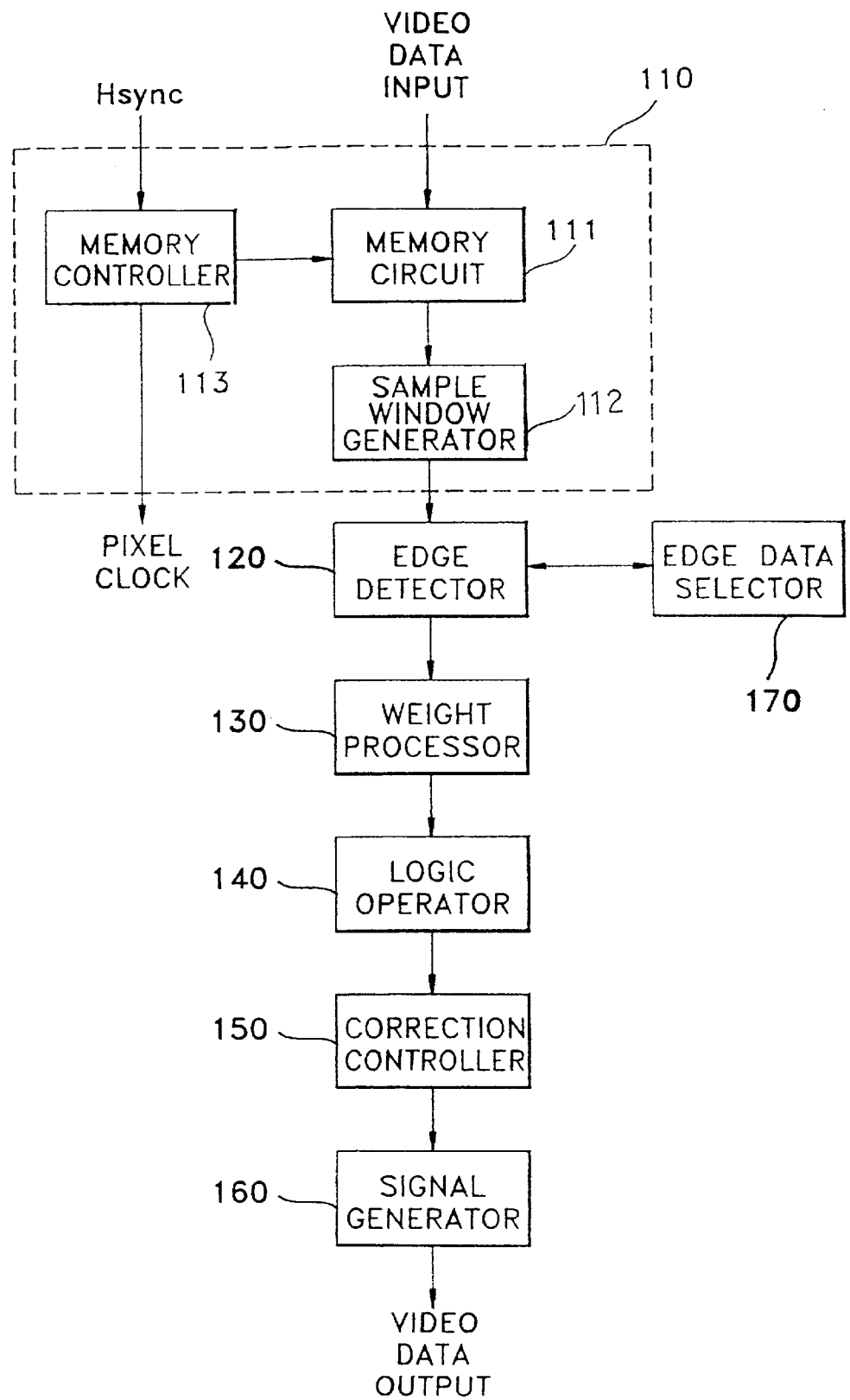
FIG. 1 is a block diagram of a conventional image formation apparatus in a laser printer.
Figure 7A:
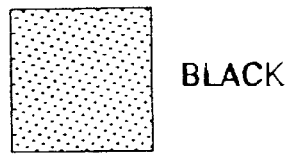
FIGS. 7A–7H show dot patterns with respect to a correction image dot modulation signal in the image formation apparatus of FIG. 1.
Figure 7B:
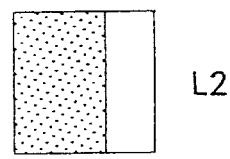
Figure 7C:
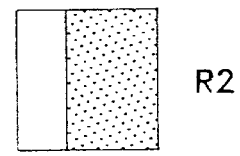
Figure 7D:
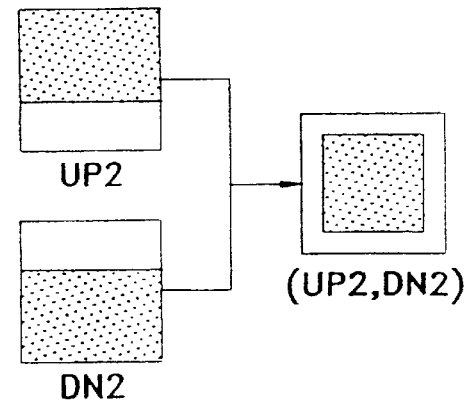
Figure 7E:
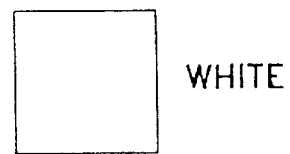
Figure 7F:
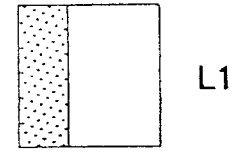
Figure 7G:
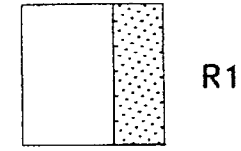
Figure 7H:
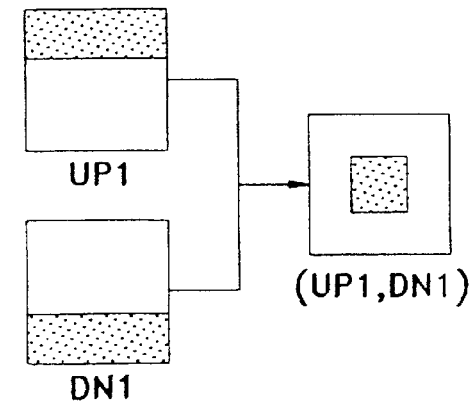
Figure 8:
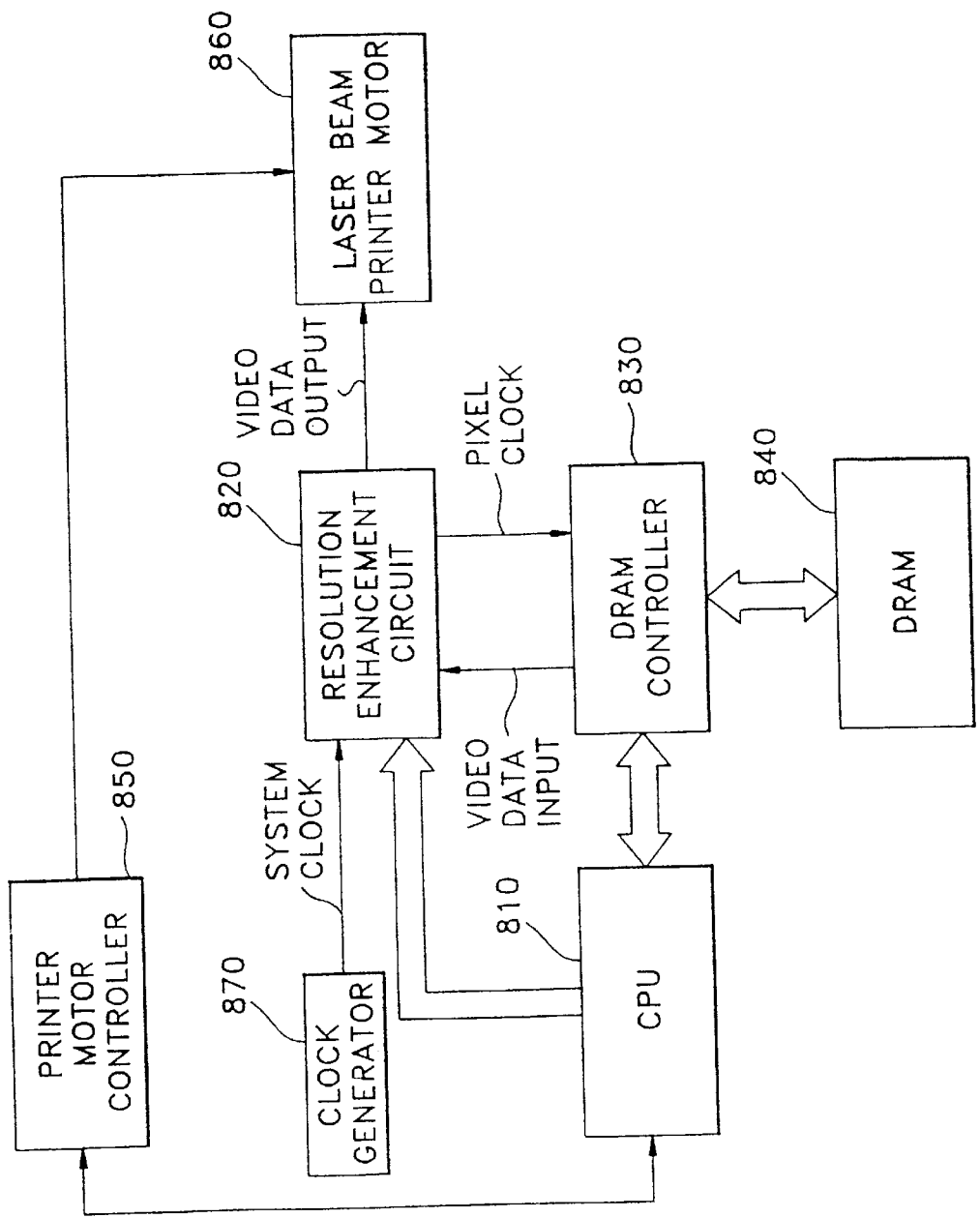
FIG. 8 is a block diagram of a laser printer adopting a resolution enhancing method and apparatus to which the present invention is adapted.

A resolution enhancement apparatus in a laser printer according to preferred embodiments of the present invention relates to an actual embodying method of an algorithm of a portion corresponding to a resolution enhancement circuit 820 in the laser printer shown in FIG. 8. A printing process of the laser printer is performed by supplying information stored in a dynamic random access memory (DRAM) 840 to a laser beam printer engine 860 via a DRAM controller 830 and resolution enhancement circuit 820. If a printing instruction is given by a central processing unit (CPU) 810, the DRAM controller 830 reads bitmap data from the DRAM 840 and sends the read data sequentially to the resolution enhancement circuit 820. The resolution enhancement circuit 820 sends a pixel clock to the DRAM controller 830 in synchronization with serially input video data, processes the video data input signal and sends the result to the laser beam printer engine 860 for printing. A printer engine controller 850 receives horizontal and vertical sync signals from the CPU 810 and controls the movement of the laser beam printer engine 860. The control signal supplied to the resolution enhancement circuit 820 from the CPU 810 controls the various modes thereof. A clock generator 870 generates a system clock for the synchronization of the resolution enhancement circuit 820.

The output of the DRAM controller 830, that is, the video data input signal to the resolution enhancement circuit 820 of FIG. 8, is bitmap data of an image to be printed. The resolution enhancement circuit 820 receives the bitmap data to determine an image pattern, and sends a modulated signal to a laser beam driver (not shown) of the laser beam printer, so that resolution can be enhanced according to the image pattern. In this embodiment, an image pattern determining method adopts a method of reading bitmap image of a 5×5 sample window and performing a two-step process. Here, there are two modes of operation, an "8" mode and a "4" mode, according to modulation ratios. In 4-mode operation, the system clock from the clock generator 870 has a frequency four times that of a bitmap sync clock for modulation operations, i.e., the pixel clock; while the frequency of the system clock in 8-mode operation is eight times the pixel clock. Therefore, 8-mode operation allows for more patterns than 4-mode operation. However, since 8-mode operation modulates each pixel with eight system clock pulses, a limitation would occur if used for a high speed system; hence, 4-mode operation is used for high speed systems. For example, since the pixel clock frequency of a 600 dpi–16 ppm system is 16 MHz, a 128 MHz system clock is necessary for use in the "8" mode. Such a high clock frequency requires additional synchronization circuitry, such as a phase-locked loop, thereby increasing production costs.

Figure 9:
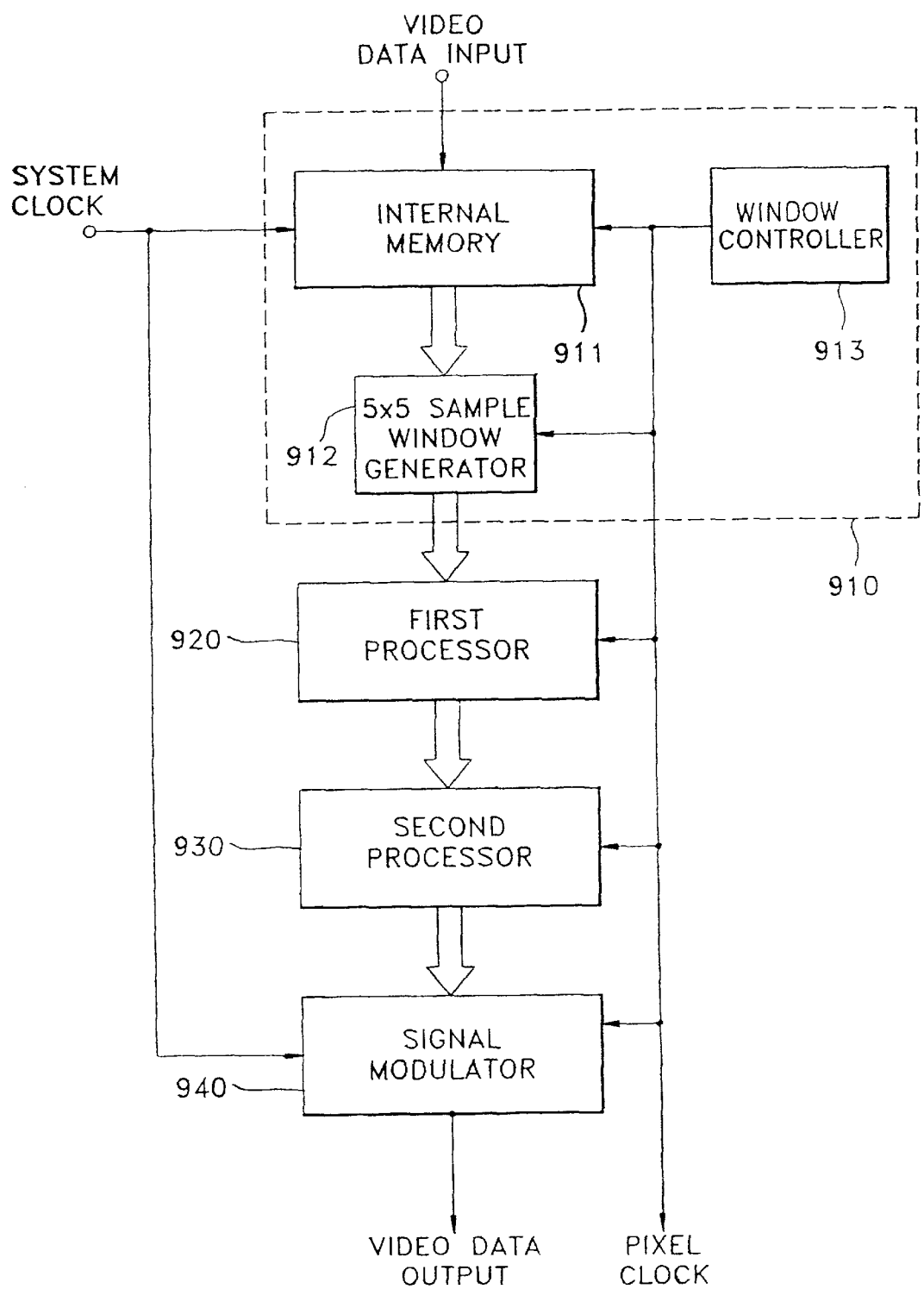
FIG. 9 is a block diagram of a resolution enhancing apparatus in a laser printer according to a preferred embodiment of the present invention.

The resolution enhancement apparatus of the laser printer in this embodiment includes a memory portion 910, a first processor 920, a second processor 930 and a signal modulator 940, as shown in FIG. 9.

The operation of this embodiment will be briefly described by referring to FIG. 9. Here, a 5×5 sample window is produced in the memory portion 910. The first processor 920 receives the 5×5 sample window and outputs nine 3×3 sample windows whose center pixels are the center pixel of the 5×5 sample window and eight peripheral pixels thereof, thereby producing basic image data for enhancing resolution by applying primary mask patterns to the nine sample windows. The second processor 930 processes the image data of the 3×3 sample window centering on the center pixel of the 5×5 sample window and determines a proper modulation pattern corresponding to the 3×3 sample window. Then, the signal modulator 940 produces a modulated signal according to the pattern.

In FIG. 9, the memory portion 910 stores the serially input video data bitmap supplied from the DRAM controller 830 of FIG. 8, and produces a 5×5 sample window so as to be processed in the following stage. The memory portion 910 includes a memory 911, a 5×5 sample window generator 912, and a window controller 913. The memory 911 has an 8Kb capacity composed of four rows, which is designed to be adapted to laser printers using A4-sized sheets which consume 4K-bits per row and to those using A3-sized sheets which consume 8K-bits per row, and receives the video data input from the DRAM controller 830. The window controller 913 is synchronized with the video data input and supplies the pixel clock to the DRAM controller 830 of FIG. 8. Also, the memory 911 receives the system clock from the clock generator 870 of FIG. 8. Although not shown in FIG. 9, the memory portion 910 also receives a control signal from the CPU 810 of FIG. 8. The memory 911 and the 5×5 sample window generator 912 operate under the control of the window controller 913.

Figure 10:
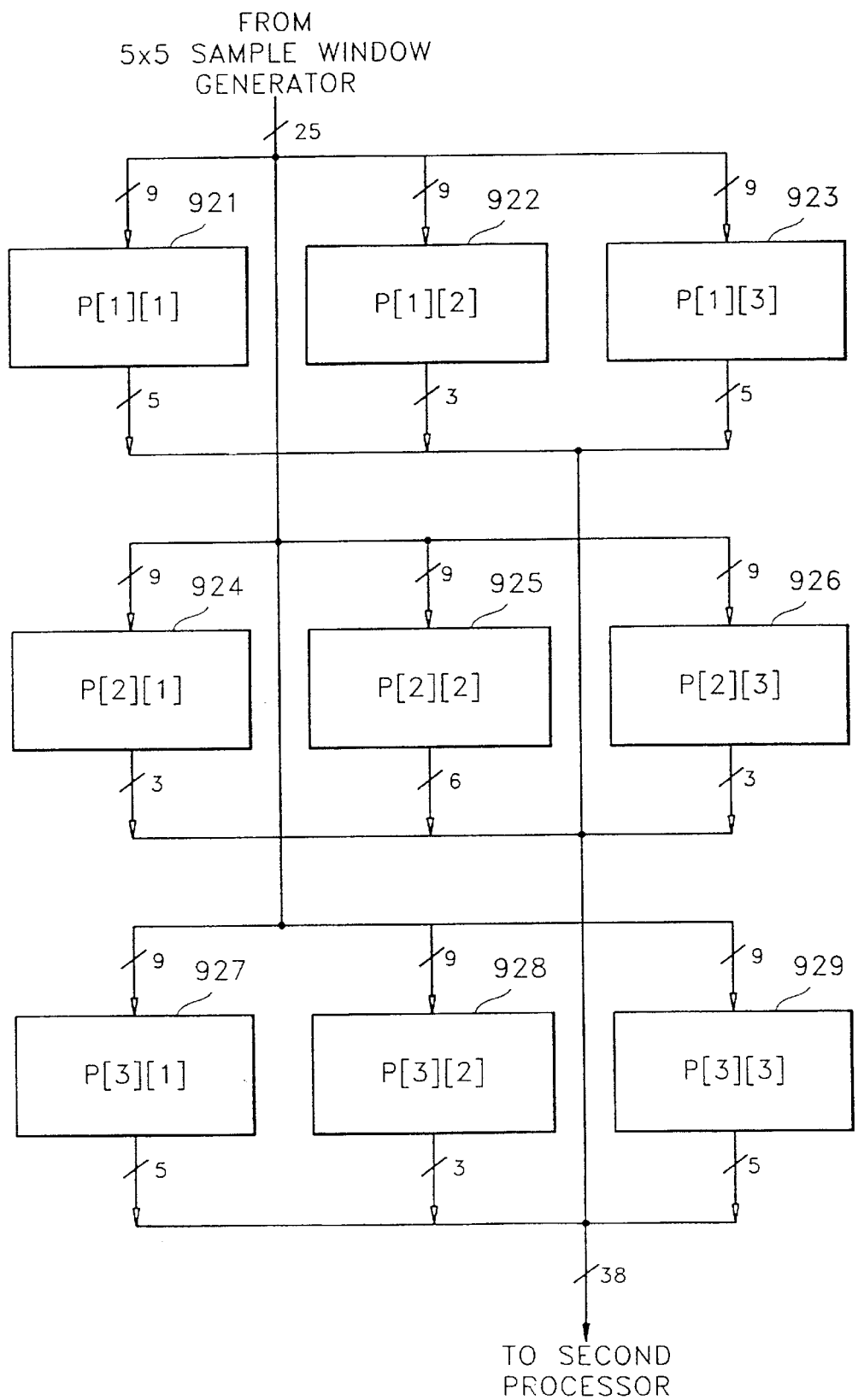
FIG. 10 is a block diagram of the first processor shown in FIG. 9.

As shown in FIG. 10, the first processor 920 includes nine parallel processors 921–929 in the form of nine data registers, each operating independently of the others. In FIG. 10, p[j][i] represents the pixel of the jth row and ith column, in which case p[3][3] represents the third row and the third column. Each parallel processor in the first processor 920 determines one coincident mask among forty patterns from mask 1 to mask 40 shown in FIG. 13, and, according to the coincident mask, outputs predetermined data Dp[j][i][D (5:0)] to the second processor 930. Here, the first processor 920 does not separately produce 3×3 sample windows which become an input of each of parallel processor 921–929; rather each parallel processor of FIG. 10 selectively connects the processor inputs from the 5×5 sample window as shown in FIG. 12A, to form a 3×3 sample window as shown in FIG. 12B. As a result, a total of nine 3×3 sample windows are formed.

The second processor 930 uses values of the data register in the 3×3 sample window processed in the first processor 920, that is, Dp[1][2], Dp[3][2], Dp[2][1] and Dp[2][3] which are located up, down, left and right of p[2][2], and determines a group classification A, B, C, D, G, H, I, J, K, L or M of Table 2 (described later). The second processor 930 uses values of the data register of Dp[1][1], Dp[1][3], Dp[3][1] and Dp[3][3] in the diagonal direction of the remainder Dp[2][2], to perform a specific process with respect to Group E (described later). Also, the second processor 930 determines whether a Group F for modifying a pixel density should be performed to support a toner-saving mode. Also, the second processor 930 determines whether the Group G for modifying a pixel should be performed to process a curved portion of the pixel not an inclined portion thereof into smooth (fine) form. Also, the second processor 930 determines whether the Group H for modifying a pixel should be performed to reduce the width of the inter-pixel variation of a curved portion of the pixel belonging to an inclined portion. Here, the Groups A and B modify the density and direction of the pixel in the bitmap data which has not been processed in the first processor.

Also, the Groups C, D, G and H modify the result modified in the first processor in a fine form. Also, the Group E modifies the result modified in the first processor in a sharp form. The Group F has a mask of the form for supporting the toner-saving mode. The Group I smoothens a three-step font, in which a 100% pixel is changed into a 0% pixel and a 0% pixel is changed into a 100% pixel to smoothen the data. The Group J corrects a graphic pattern into a continuous groove shape. The Group K changes a pixel modified into center 50% into another pixel having up and down or left and right 25% to achieve connection of a smooth external curve, in the result of the edge processing of the first processing step. The Group L represents a portion which is sharply indicated as in the Group E, in which the former is applied to the two-step font differently from the one-step font in the latter. The Group M processes a portion formed of a three-step font in which since the three-step font is changed into a one-step font in the first processing step, a left-center or right-center 25% pixel is added to the center portion of the three-step font to remove the one-step font.

The signal modulator 940 receives the system clock from the clock generator 870 of FIG. 8, determines a modulation pattern according to the result of the second processor 930, and outputs a modulated signal to drive the laser beam printer engine 860. The signal modulator 940 uses a 4/8 flag for discriminating between 4-mode and 8-mode operation by a control signal from the CPU 810, and a thickness flag for determining a thin mode, an intermediate mode and a thick mode, which can be designed to be used flexibly for various applications. There are nineteen modulation signals in 8-mode operation and fourteen in 4-mode operation, with the mode being determined by a user.

As shown in FIG. 9, the first processor 920, the second processor 930 and the signal modulator 940 operate in synchronization with the pixel clock output from the window controller 913. The operation of the FIG. 9 apparatus will be described below with reference to FIGS. 9 through 31A–31F.

Figure 11A:
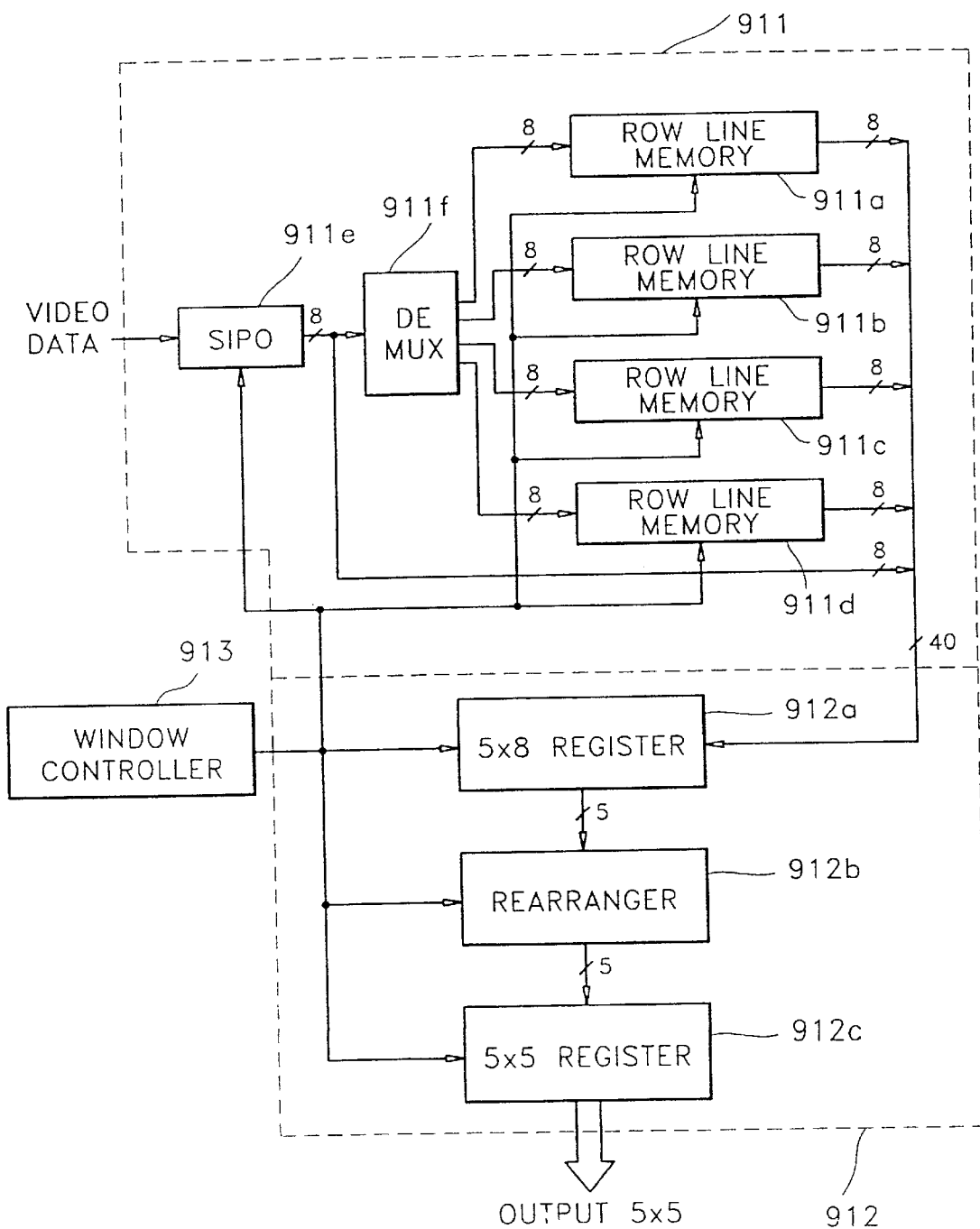
FIG. 11A is a detailed block diagram showing a preferred example of the memory portion shown in FIG. 9.

The memory portion 910 receives the video data input signal, a sequentially scanned input from the DRAM controller 830, and stores the received input signal according the horizontal width of the printed page from the first row of memory 911. FIG. 11A is a detailed block diagram of memory portion 910 of FIG. 9. In FIG. 11A, a serial-input-parallel-output (SIPO) portion 911e including an 8-bit shift register receives 8-bit video data from the DRAM controller 830 of FIG. 8 and shifts the received input data by one byte to a designated row every eighth clock pulse. In this way, the SIPO portion 911e converts a serial input into an 8-bit parallel output. A demultiplexer 911f receives the converted 8-bit parallel data to be output to row line memories 911a–911d. The row line memories each store bitmap data corresponding to one row, in byte units. A 5×8 register 912a stores the output of memory 911, in byte units. A rearranger 912b rearranges the sequence of an input row, to match the row sequence of the original bitmap image data. The rearranger 912b counts rows changes and, using a multiplexer, changes the row sequence according to the counted result.

The output of the SIPO portion 911e is also applied directly to the input of the 5×8 register 912a as shown in FIG. 11A. The 5×8 register 912a is used for producing a 5×5 sample window together with the four row line memories 911a–911d. That is, information of the 8-bit SIPO portion 911e for storing the sequential input from the DRAM controller 830 shown in FIG. 8 is applied also to the fifth input constituting the 5×5 sample window, and is also used as input signal of the row which is currently designated to store via demultiplexer 911f. By using such a structure, a 5×5 sample window can be produced using just four row line memories 911a–911d instead of five. However, the video data input signal supplied from the DRAM controller 830 is converted by the SIPO portion 911e. Thereafter, the output value of the SIPO portion 911e is stored in the row line memory 911a if the value of a counter (not shown) is 0, is stored in the row line memory 911b if the counter value is 1, is stored in the row line memory 911c if the counter value is 2, and is stored in the row line memory 911d if the counter value is 3, via the demultiplexer 911f. That is, the output of the SIPO portion 911e is filled from the first row according to a sequence of the row line memories 911a–911d. Thereafter, when the fourth row is filled with the output value of the SIPO portion 911e, the first row starts filling again. Accordingly, the sequence of the row line memories 911a–911d differs from the sequence of the input signal row. Thus, the rearranger 912b has information with respect to the sequence and uses the sequence information to rearrange the information from row line memories 911a–911d to coincide with the sequence of the 5×5 sample window. For example, when input data is entered in the sequence of rows A, B, C, D, E and F, the row A is stored in the first row of the row line memory, the row B is stored in the second row thereof, the row C is stored in the third row thereof, and the row D is stored in the fourth row thereof. Then, the row E is again stored in the first row thereof. When the row F is filled, the output of the row line memory becomes a sequence of the rows of E, B, C and D. Then, the row F is entered as the fifth row, and the 5×8 register 912a stores data in sequence of E, B, C, D and F. Therefore, this sequence should be changed for processing of the first processor 920. The rearranger 912b rearranges the data in sequence of B, C, D, E and F. Therefore, the four row line memories 911a–911d need not shift the data from the lower row to the upper row to match a sequence of the data. Accordingly, a shift register is not needed between the respective rows.

Figure 11B:
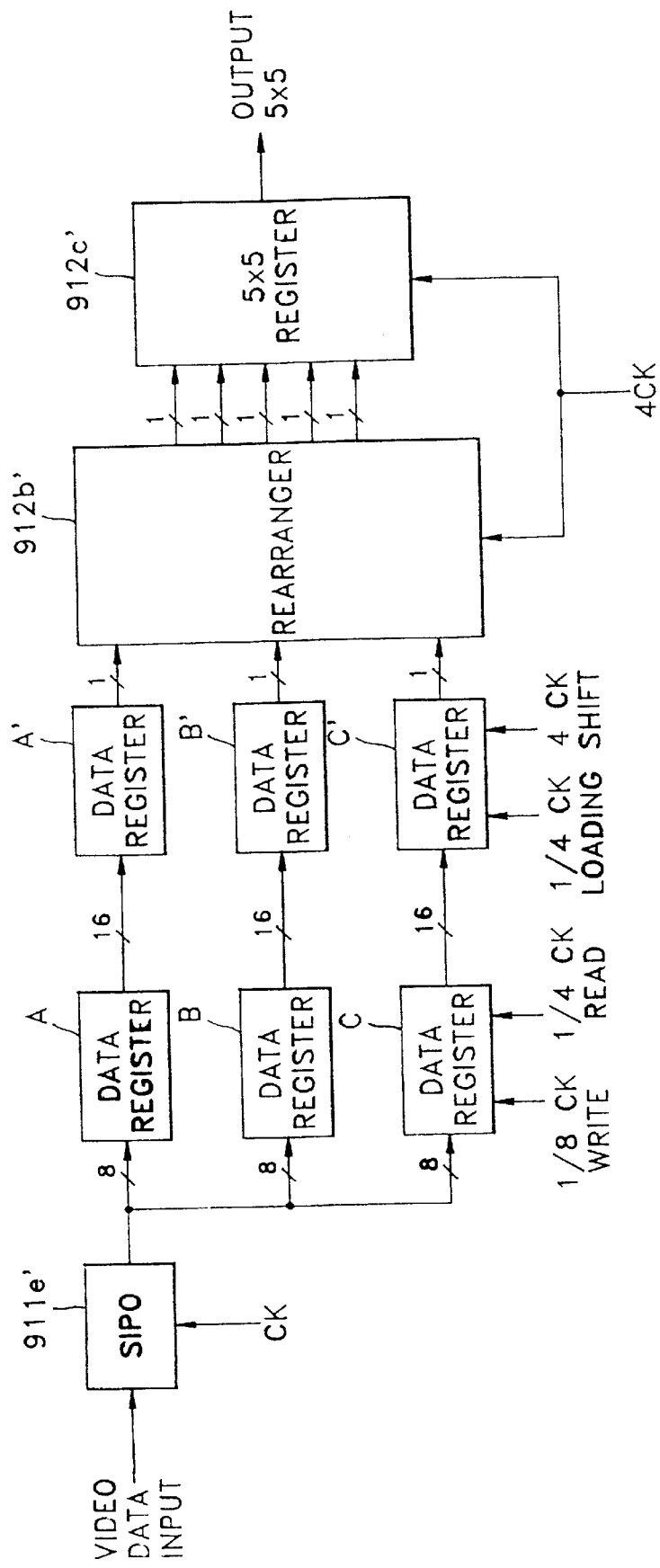
FIGS. 11B and 11C show a detailed block diagram showing another preferred example of the memory portion shown in FIG. 9 and a 5×5 sample window as the output thereof, respectively.

FIG. 11B shows another example of the memory portion 910 shown in FIG. 9, which represents a circuitry design for embodying a doubling function. In the doubling function, the width of the input bitmap data increases horizontally and vertically by two times to reconstruct the form of the dot. Therefore, the doubled bitmap data passes through a font quality enhancing algorithm. This function can expand the output result of 300 dpi data into 600 dpi data and outputs the expanded result.

In FIG. 11B, the input pixel data is received and is synchronized with a clock frequency CK in a SIPO converter 911e' as shown in FIG. 11A. Thus, the serial data is converted into parallel data. The parallel data is stored 8-bit data registers A, B and C, respectively. This data is expanded into 16-bit data and then is stored in 16-bit data registers A', B' and C'. For this purpose, a read clock frequency (¼)CK of the 8-bit data registers A, B and C and a load clock frequency (¼)CK of the 16-bit data registers A', B' and C' are both two times a write clock frequency (⅛)CK of the 8-bit data registers A, B and C. The stored 16-bit data is formed into a 5×5 sample window in the 5×5 register 912c' so as to be used together with a general mode via a rearranger 912b' in synchronization with a four times shift clock frequency dot clock 4CK. The produced 5×5 sample window applies for a font quality enhancement function and a toner-saving function, together with a general mode. The characteristic of the doubling function reads the input data by twice and rearranges to reconstruct the rearranged data into four pixels to apply for the font quality enhancement algorithm. Particularly, this function requires an algorithm enabling a two-step process since no one-step pattern exists. Accordingly, a two-step processing pattern exists in the masks 25 to 40 of the first processor. In FIG. 11B, each clock frequency signal is provided from a memory controller (not shown).

Figure 11C:
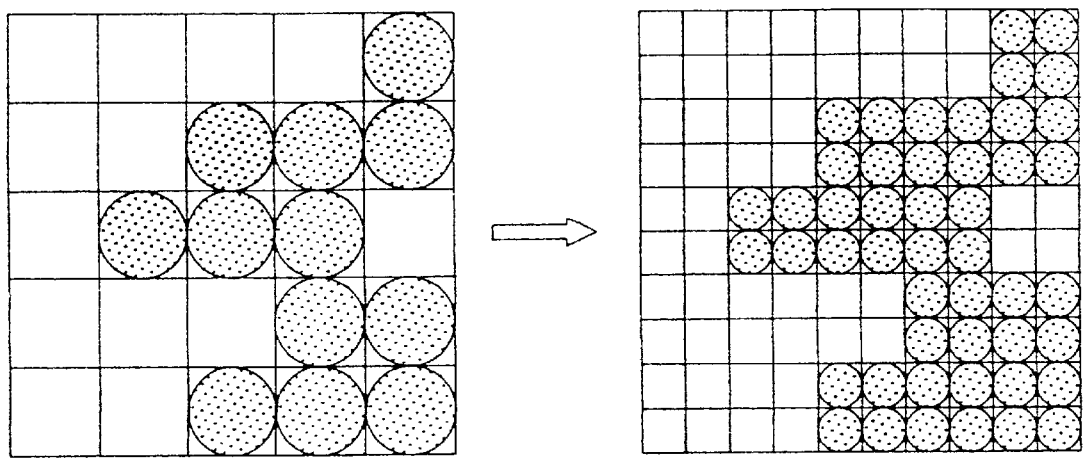

FIG. 11C shows the result of the 5×5 sample window obtained after the input bitmap data passes via the doubling function. As shown in FIG. 11C, the bitmap data is divided into four, to be produced into a 5×5 sample window.

As shown in FIG. 10, each processor 921–929 in the first processor 920 determines an output result according to a result whether data of one pixel and eight peripheral pixels in the 3×3 sample window as shown in FIG. 12B coincides with one from among mask 1 to mask 40 of FIG. 13. A method for determining whether input data of the first processor 920 coincides with mask patterns is logically designed by comparing the bitmap data of the pixel having a "0" portion in the mask with the bitmap data of the pixel having a "1" portion in the mask and outputting a "1" if the result coincides with the 3×3 sample window of FIG. 12B. Each processor stores an output having direction information and density information with respect to pixel data p[1][1] through p[3][3] in registers of Dp[1][1] through Dp[3][3]. As shown in Table 1, this output is composed of six bits in which bits D5, D4 and D3 have direction information, and bits D2, D1 and D0 have density information. The direction information is classified into seven kinds, and the density information is classified into nine kinds. Here, the two kinds of expressions with respect to the densities 011 and 111 are set for supporting a toner-saving mode and a three-step font. However, each processor outputs only the bits necessary in the second processor 930 among six bits according to the position of the pixel to be processed, as shown in the output data of FIG. 10. For example, when the pixel data p[2][2] is processed, a value of pixel data p[2][2] and eight values of the peripheral pixel data are compared with values of mask 1 to mask 40 to determine a pattern. If the pixel data p[2][2] coincides with mask 12, the direction information is "L" and the density information has a value of 50%, which results in a pixel density of Dp[2][2][D5, D4, D3, D2, D1, D0], that is, "110100." When the input, that is, the shape of the 3×3 sample window in the center of each processing pixel, coincides with one from mask 1 to mask 40 at the processing of the center pixel of FIG. 12B, each processor outputs a processing result with respect to the mask. The processing results of the respective masks are represented as follows.

In pixels p[j−1][i−1] through p[j+1][i+1]:
when mask 1, p[j][i]=TB and dot density=50%;
when mask 2, p[j][i]=R and dot density=50%;
when mask 3, p[j][i]=TB and dot density=50%;
when mask 4, p[j][i]=L and dot density=50%;
when mask 5, p[j][i]=R and dot density=50%;
when mask 6, p[j][i]=TB and dot density=50%;
when mask 7, p[j][i]=R and dot density=50%;
when mask 8, p[j][i]=TB and dot density=50%;
when mask 9, p[j][i]=L and dot density=50% ;
when mask 10, p[j][i]=TB and dot density=50%;
when mask 11, p[j][i]=TB and dot density=50%;
when mask 12, p[j][i]=L and dot density=50%;
when mask 13, p[j][i]=CR and dot density=25%;
when mask 14, p[j][i]=CR and dot density=25%;
when mask 15, p[j][i]=CL and dot density=25%;
when mask 16, p[j][i]=CL and dot density=25%;
when mask 17, p[j][i]=R and dot density=62.5%;
when mask 18, p[j][i]=TB and dot density=62.5%;
when mask 19, p[j][i]=R and dot density=62.5%;
when mask 20, p[j][i]=TB and dot density=62.5%;
when mask 21, p[j][i]=L and dot density=62.5%;
when mask 22, p[j][i]=TB and dot density=62.5%;
when mask 23, p[j][i]=TB and dot density=62.5%;
when mask 24, p[j][i]=L and dot density=62.5%;
when mask 25, p[j][i]=CC and dot density=50%;
when mask 26, p[j][i]=CC and dot density=50%;
when mask 27, p[j][i]=CC and dot density=50%;
when mask 28, p[j][i]=CC and dot density=50%;
when mask 29, p[j][i]=CC and dot density=50%;
when mask 30, p[j][i]=CC and dot density=50%;
when mask 31, p[j][i]=CC and dot density=50%;
when mask 32, p[j][i]=CC and dot density=50%
when mask 33, p[j][i]=straight;
when mask 34, p[j][i]=straight;
when mask 35, p[j][i]=straight;
when mask 36, p[j][i]=straight;
when mask 37, p[j][i]=straight;
when mask 38, p[j][i]=straight;
when mask 39, p[j][i]=straight; and
when mask 40, p[j][i]=straight.

The output value of the first processor 920 is stored in the register of Dp[j][i] according to the above result. The second processor 930 receives and processes the output from the first processor 920. Each of the parallel processors 921–929 sets the output into zero when the input 3×3 sample window does not coincide with any one of mask 1 through mask 40.

TABLE 1

| D2 | D1 | D0 | density |
|---|---|---|---|
| 0 | 0 | 0 | 0% (bitmap=0) |
|   |   |   | 100% (bitmap=1) |
| 0 | 0 | 1 | 12.5% |
| 0 | 1 | 0 | 25% |
| 0 | 1 | 1 | 50%:50% for toner-saving mode |
| 1 | 0 | 0 | 50% |
| 1 | 0 | 1 | 62.5% |
| 1 | 1 | 0 | 75% |
| 1 | 1 | 1 | 100% (toner-saving mode) |
|   |   |   | 100% (bitmap=0) |
|   |   |   | 0% (bitmap=1) |

| D5 | D4 | D3 | direction |
|---|---|---|---|
| 0 | 0 | 0 | center-right; CR |
| 0 | 0 | 1 | center-left; CL |
| 0 | 1 | 0 | top/bottom; TB |
| 0 | 1 | 1 | center; CC |
| 1 | 0 | 0 | right; R |
| 1 | 1 | 0 | left; L |
| 1 | 1 | 1 | straight |

The pixel p[2][2] is a pixel to be currently processed among the processing result of the first processor 920 as the center pixel. Accordingly, when the pixel is not processed in the second processor 930, the processing result of the first processor 920 can become an input to the signal modulator 940, the pixel should have values of both direction and density. The values of Dp[j][i][D(5:0)] coming from the processing result of the first processor 920 should have the following information according to the above set of pixel bits. When Dp[j][i][D2]=1, the density information is p[j][i]=50% or 62.5%, thereby indicating that the information has been processed in the first processor 920. When Dp[j][i][D4]=1, the direction information stipulates that p[j][i] can be top or bottom (TB) information or center or left (CL) or straight information. When Dp[j][i][D5]=1, the direction information is that p[j][i] can be right or left (RL) or straight information.

Figure 14A:
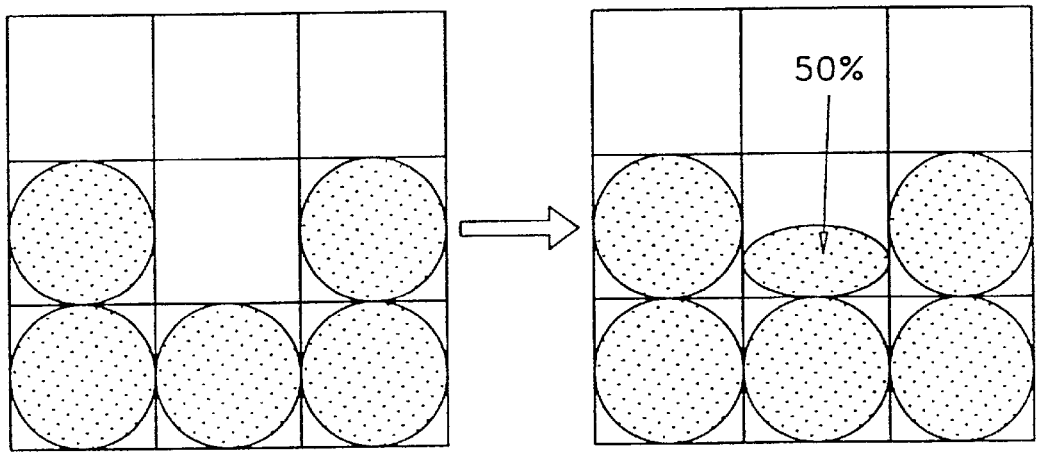
FIGS. 14A–14F each show pattern diagrams of the before and after results of image data processed according each pixel arrangement in the first processor of FIG. 9.
Figure 14B:
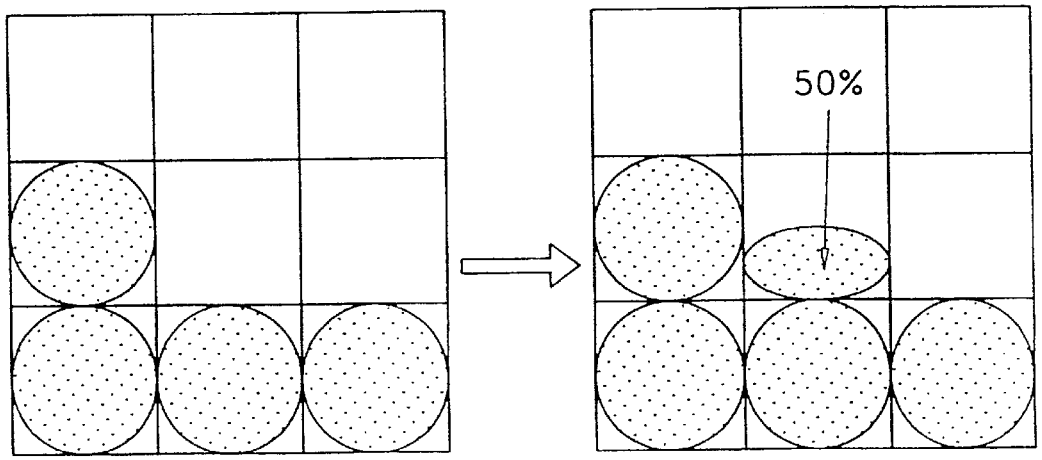
Figure 14C:
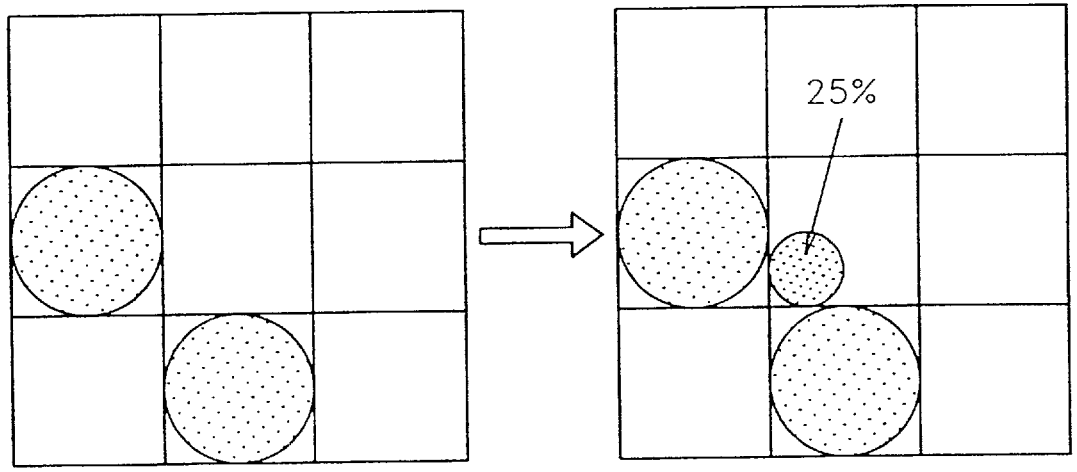
Figure 14D:
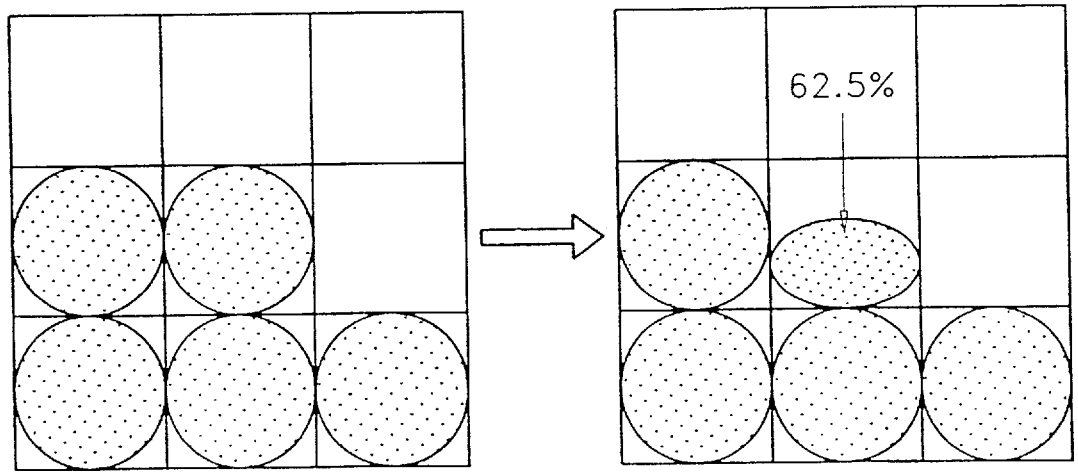
Figure 14E:
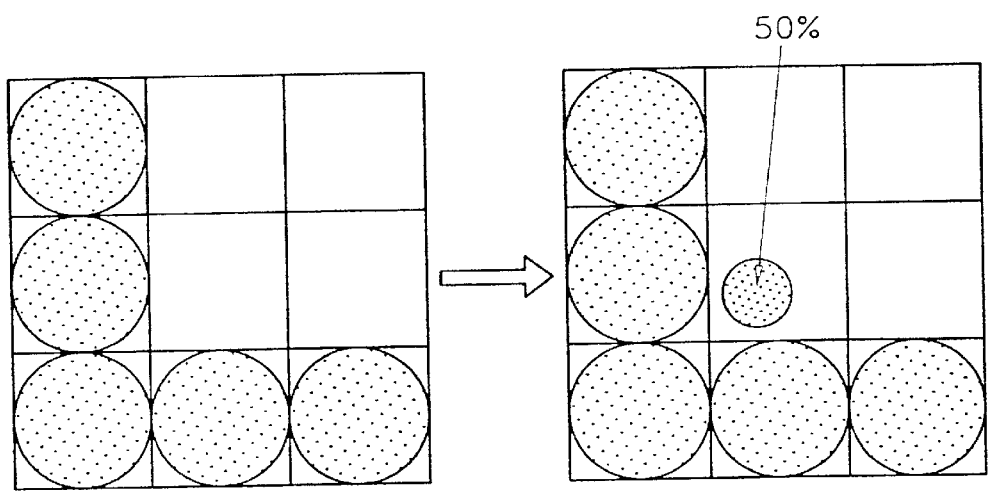
Figure 14F:
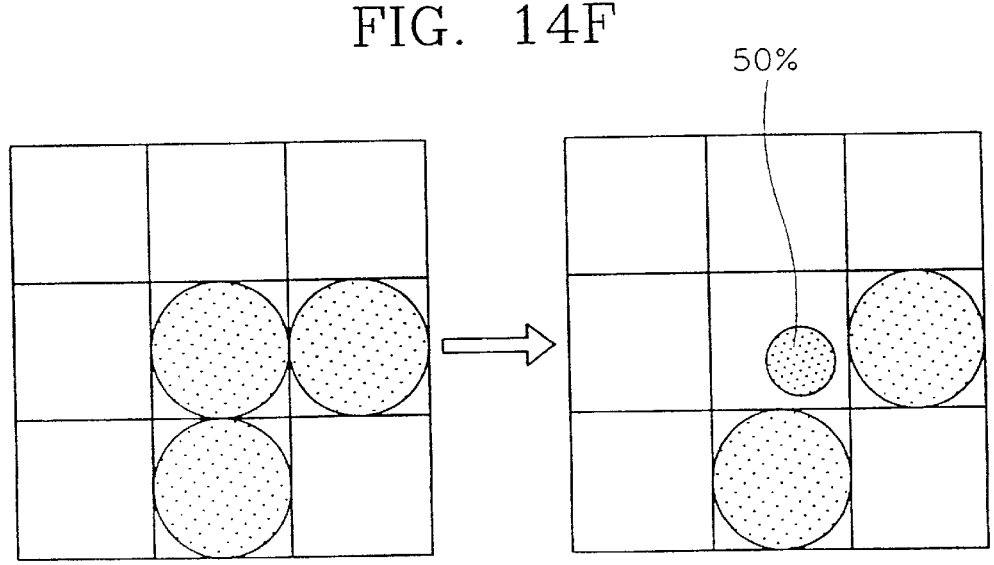

During the time when the second processor 930 processes the output of the first processor 920, the first processor 920 reads a 5×5 sample window of the following row from the memory portion 910 and processes the read result. That is, the first processor 920 sends the processing result to the second processor 930 according to the pixel clock of FIG. 9 and operates in a pipeline manner in which another input is received from the memory portion 910 and processed and the received input is processed. In case of mask 1 to mask 4 among objects to be processed in the first processor 920, that is, in the case of a dot pattern having a groove shape, a 50% pixel is filled in the groove as shown in FIG. 14A. By filling this groove, a change between the dots is reduced to produce a smooth pattern. In the case of mask 5 to mask 12, that is, in the case of a dot pattern having horizontal and vertical lines and inclined lines, a 50% pixel is filled to reduce an abrupt change as shown in FIG. 14B. That is, the filled pixel smoothens an instantaneous change between pixels, such that the inclination is softened. In the case of mask 13 to mask 16, a 25% pixel is filled, to remove a step phenomenon in a 45° dot pattern as shown in FIG. 14C. In the case of mask 17 to mask 24, a 100% pixel is changed into a 62.5% pixel in a dot pattern having vertical, horizontal and inclined lines, to reduce an abrupt change as shown in FIG. 14D. In the case of mask 25 to mask 40, a 50% pixel is filled, to soften a two-step dot pattern into a smoothened pattern as shown in FIGS. 14E and 14F.

The mask patterns 33–40 discriminate horizontal or vertical line patterns, which are used for smoothening three-step dot pattern. These eight mask patterns do not change the density of the center pixel in the first processor, but sets the direction of the pixel to be "straight" to represent that the pixel exists on the horizontal or vertical line. The resultant data is sent to the second processor, so that the data is processed in the Group I in the second processor.

The second processor 930 determines the group to which Dp[j][i] being an output of the first processor 920 belongs, among the following eight groups. Although not shown in the drawings, the second processor 930 receives a 3×3 sample window from the first processor 920, and determines the position and density of the pixel data using data p[1][1], p[1][3], p[3][1] and p[3][3] being the diagonal data of p[2][2] and the pixel data p[1][2], p[2][1]. p[2][3] and p[3][2] being the upper, lower, left and right pixels of p[2][2]. The second processor 930 includes blocks for determining the group to which the pixel data belongs according to the determined position and density. The position and density calculation of the pixel can be performed by prestored data and a software program. Here, the detailed description of the elements will be omitted and only the processing procedure will be described below.

Group A: portions such that the magnitude thereof should be processed to 75% among current "1" pixels Group B: portions such that the magnitude thereof should be processed to 50% among current "1" pixels Group C: portions such that the current "0" pixels should be processed to 25%; or portions such that a pixel modified into 50% in the result of the first processing, should be processed to 12.5% to reduce a width of variation between the pixels Group D: portions such that a pixel modified into 62.5% in the result of the first processing, should be processed to 75% to reduce a width of variation between the pixels Group E: portions such that the magnitude thereof should be processed to 50%, to sharpen the shape of an edge acute angle among current "0" pixels Group F: portions such that the magnitude thereof should be processed to CC 50%, CL25% or 0% among current "1" pixels as a toner-saving mode filter Group G: portions such that a pixel modified into CC 50% in the result of the first processing, should be processed to 75% to reduce a width of variation between the pixels Group H: portions such that a pixel modified into R/L 50% in the result of the first processing, should be processed to R/L 25% to reduce a width of variation between the pixels Group I portions such that a pixel variation judged as a three-step font in the result of the first processing should be smoothly processed Group J portions such that a pattern judged as a graphic pattern in the result of the first processing, should be processed into an original pattern Group K portions such that a pixel modified into 50% in the result of the first processing should be modified into TB or R/L 25% to smoothly connect an external edge curve Group L portions such that a pattern should be sharply represented as in the Group E which is applied to the one-step font but for the Group L which is applied to the two-step font Group M portions such that a CL or CR 25% pixel is added to the center portion of three-step font with a three-step processing pattern Pixel data Mxy plays an important role in determining the group and represents the density of a pixel located in a particular position. In the pixel data Mxy, the "x" value represents pixel position. In more detail:

M1y represents the density of pixel p[1][2];
M2y represents the density of pixel p[3][2];
M3y represents the density of pixel p[2][1]; and
M4y represents the density of pixel p[2][3].

Here, the density value of each pixel is varied according to the "y" value. Mxy represents that the pixel density is y in correspondence to x. In more detail:

If Dp[j][i][bitmap, D2, D2]="000," then y=0;

If Dp[j][i][bitmap, D2, D1]="001," "010" or "110," then y=1;

If Dp[j][i][bitmap, D2, D1]="100", then y=2;

If y=0, then the pixel density is 0%;

If y=1, then the pixel density is 25%, 50% or 62.5%; and

If y=2, then the pixel density is 100%.

For example, if M12, the pixel density of p[1][2] is 100%; and if M30, the pixel density of p[2][1] is 0%.

The Mxy values are used for determining one of the thirteen groups (A, B, C, D, E, F, G, H, I, J, K, L and M), according to the result of the first processor 920. Referring to the classification of groups according to Mxy, a classifying method thereof except for the groups E, F and I is shown in Table 2. For example, in the case of M12, M21, M32 and M40, the pixel data can be classified in Group A or D. The Mxy value is classified as a proper group according to the density of the pixel p[2][2] after passing through the first processor 920. Here, the Mxy value is determined logically according to the above description.

TABLE 2

| M1, M2 | M3, M4 | group |
| --- | --- | --- |
| M12, M21 or M11, M22 | M32, M40 | A |
| M12, M21 or M11, M22 | M30, M42 | A |
| M12, M20 | M32, M41 or M31, M42 | A |
| M10, M22 | M32, M41 or M31, M42 | A |
| M11, M20 | M31, M40 or M30, M41 | B |
| M10, M21 | M30, M41 or M31, M40 | B |
| M11, M21 | M32, M40 or M30, M42 | C |
| M12, M20 or M10, M22 | M31, M41 | C |
| M12, M20 | M31, M40 or M30, M41 | C |

TABLE 2-continued

| M1, M2 | M3, M4 | group |
|---|---|---|
| M10, M22 | M31, M40 or M30, M41 | C |
| M11, M20 or M10, M21 | M32, M40 | C |
| M11, M20 or M10, M21 | M30, M42 | C |
| M11, M22 | M32, M40 or M30, M42 | D |
| M12, M20 or M10, M22 | M31, M42 | D |
| M12, M21 | M32, M40 or M30, M42 | D |
| M12, M20 or M10, M22 | M32, M41 | D |
| M10, M22 | M30, M42 or M32, M40 | G |
| M12, M20 | M30, M42 or M32, M40 | G |
| M11, M20 | M30, M42 or M32, M40 | H |
| M10, M21 | M30, M42 or M32, M40 | H |
| M10, M22 or M12, M20 | M32, M42 | J |
| M12, M22 | M32, M40 or M30, M42 | J |
| M10, M22 | M32, M40 or M30, M42 | K |
| M12, M20 | M32, M40 or M30, M42 | K |
| M12, M20 | M30, M41 or M31, M40 | L |
| M10, M22 | M30, M41 or M31, M40 | L |
| M11, M20 | M30, M42 or M32, M40 | L |
| M10, M21 | M30, M42 or M32, M40 | L |
| M10, M21 | M30, M42 or M32, M40 | M |
| M11, M20 | M30, M42 or M32, M40 | M |
| M10, M22 | M31, M40 or M30, M41 | M |
| M12, M20 | M31, M40 or M30, M41 | M |

Pixel data is classified into Group A under the following conditions:

(1) when one y equals 2 and the other equals 0 for M1y and M2y (i.e., one is 100% and the other is 0% among pixels p[1][2] and p[3][2]), and one y equals 1 and the other equals 2 for M3y and M4y (i.e., one is 25%, 50% or 62.5%, and the other is 100% among pixels p[2][1] and p[2][3]); and (2) when one y equals 2 and the other equals 0 for M3y and M4y (i.e., one is 100% and the other is 0% among pixels p[2][1] and p[2][3]), and one y equals 1 and the other equals 2 for M1y and M2y (i.e., one is 25%, 50% or 62.5%, and the other is 100% among pixels p[1][2] and p[3][2].

Figure 15:
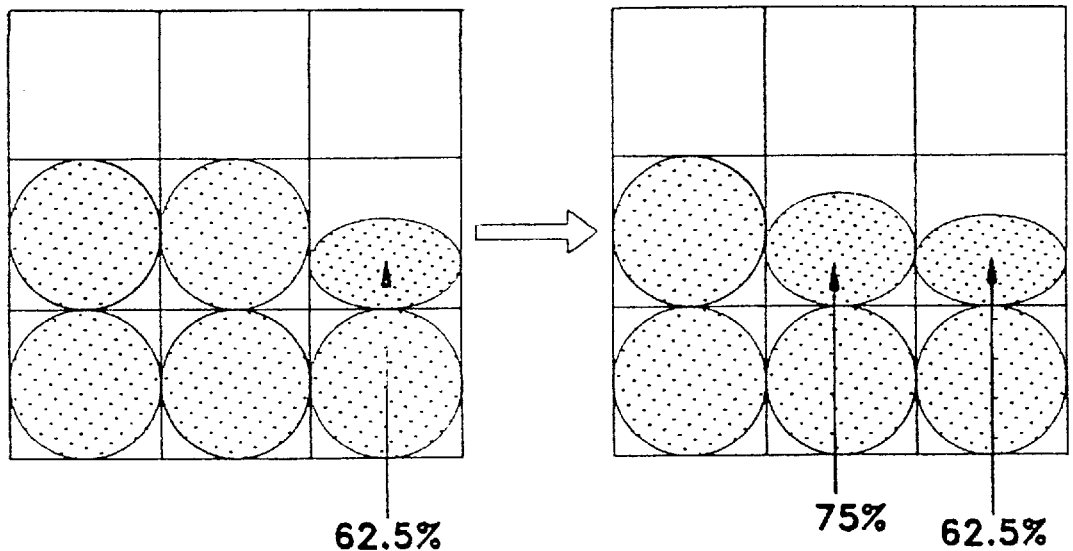
FIG. 15 shows a pattern diagram of the Group-A results of the first and second processors of FIG. 9.

FIG. 15 shows the processing result corresponding to Group A in the second processor 930. The Group A is a portion where a 100% pixel beside a 62.5% pixel should be changed into a 75% pixel, to smooth the connection between lines. However, if D2 among p[1][1] and p[1][3] is "1," then, pixels p[1][1] and p[1][3] are processed in the first processor 920 and become 50% or 62.5% pixels, respectively. Accordingly, since the amount of variation between pixels p[1][1] and p[2][2] becomes large if the pixel [2][2] is to be processed, it should not be. Thus, pixel p[2][2] is processed into a 75% pixel when D2 of pixels p[1][1] and p[1][3] is "0"; that is, pixels p[1][3] and p[3][3] are 0% or 100% pixels.

Pixel data is classified into Group B when one y equals 1 and the other equals 0 for M1y and M2y (i.e., one is 0 and the other is 25%, 50% or 62.5% among pixels p[1][2] and p[3][2]), and one y equals 1 and the other equals 0 for M3y and M4y (i.e., one is 0% and the other is 25%, 50% or 62.5% among pixels p [2] [1] and p [2] [3]).

Figure 16:
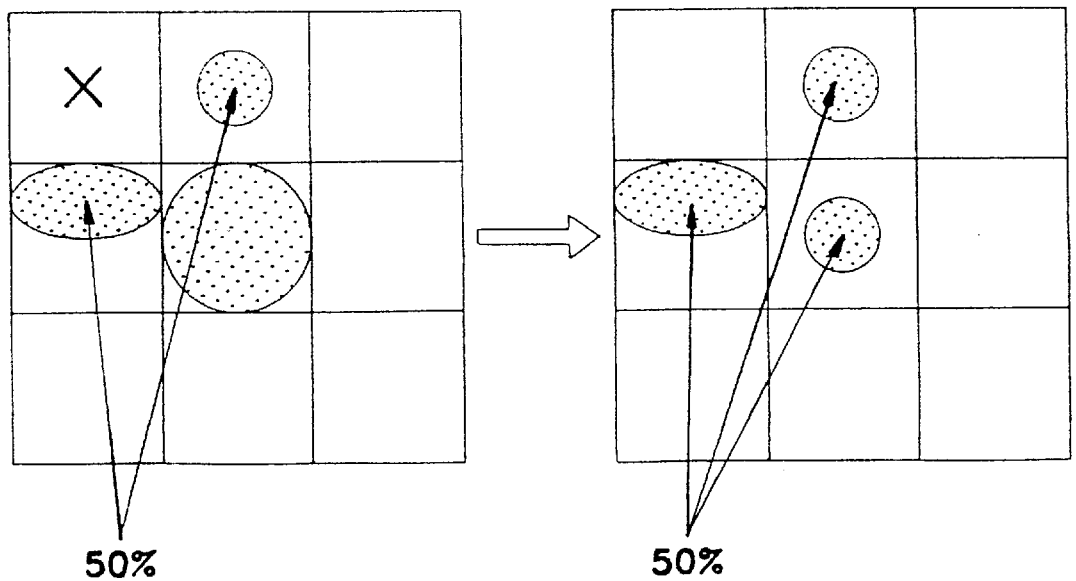
FIG. 16 shows a pattern diagram of the Group-B results of the first and second processors of FIG. 9.

FIG. 16 shows the processing result of a 3×3 sample window corresponding to Group B in the second processor 930. The Group B is a pattern to remove an edge protrusion of the pixel. Accordingly, the 100% pixel positioned in pixel p[2][2] is modified into a CC 50% pixel to smoothen the edge of the pixel. FIG. 16 shows that the p[2][2] pixel of 100% is modified into a CC 50% pixel when the pixel p[1][2] is modified into a CC 50% pixel and the pixel p[2][1] is modified into a TB 50% in the result of the first processing.

Pixel data is classified into Group C under the following conditions:

(1) when one y equals 2 and the other equals 0 for M1y and M2y (i.e., one is 100% and the other is 0% among pixels p[1][2] and p[3][2]), and one y equals 1 and the other equals 0 for M3y and M4y (i.e., one is 50% and the other is 0% among pixels p[2][1] and p[2][3]);

(2) when one y equals 2 and the other equals 0 for M3y and M4y (i.e., one is 100% and the other is 0% among pixels p[2][1] and p[2][3]), and one y equals 1 and the other equals 0 for M1y and M2y (i.e., one is 50% and the other is 0% among pixels p[1][2] and p[3][2]); and (3) when both y's equal 1 for M1y and M2y and one y equals 2 and the other equals 0 for M3y and M4y, and both y's equal 1 for M3y and M4y and one y equals 2 and the other equals 0 for M1y and M2y.

Figure 17A:
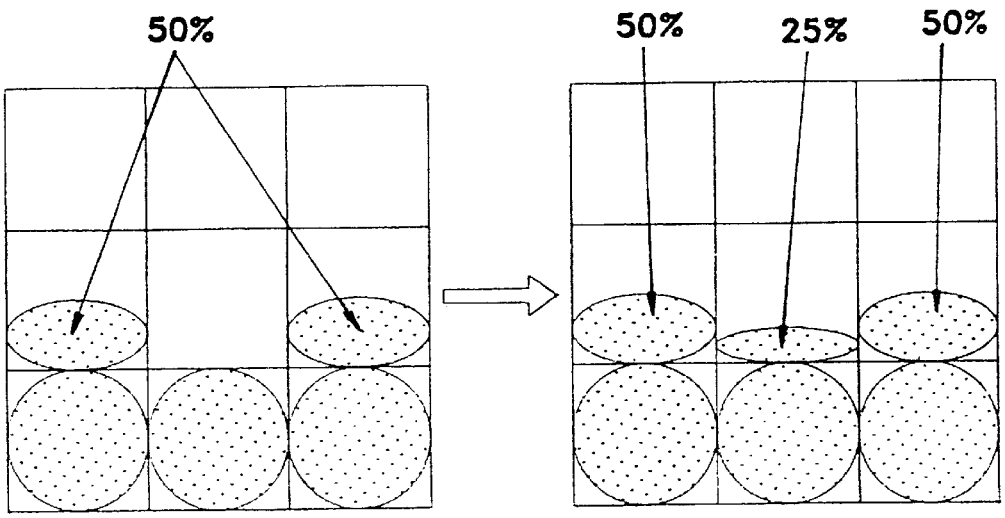
FIGS. 17A–17C each show pattern diagrams of the Group-C results of the first and second processors of FIG. 9.
Figure 17B:
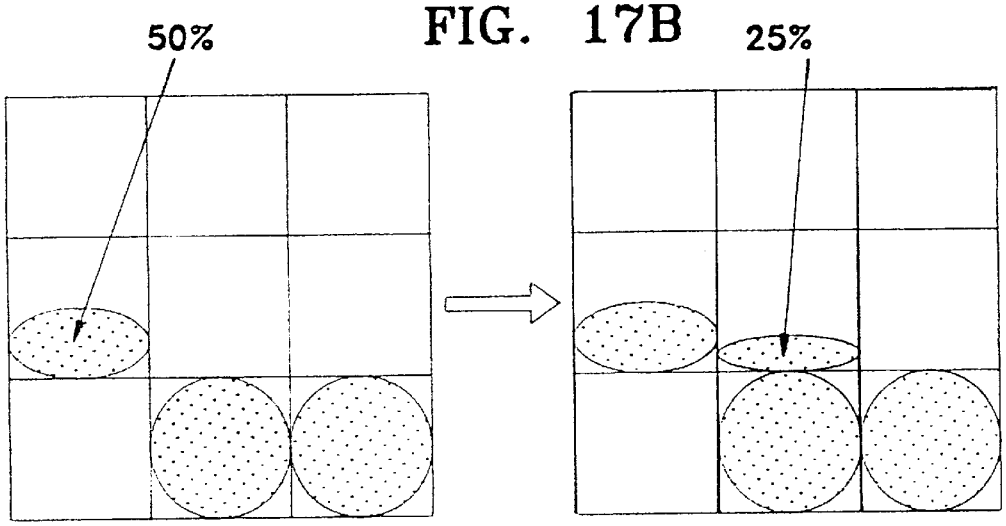
Figure 17C:
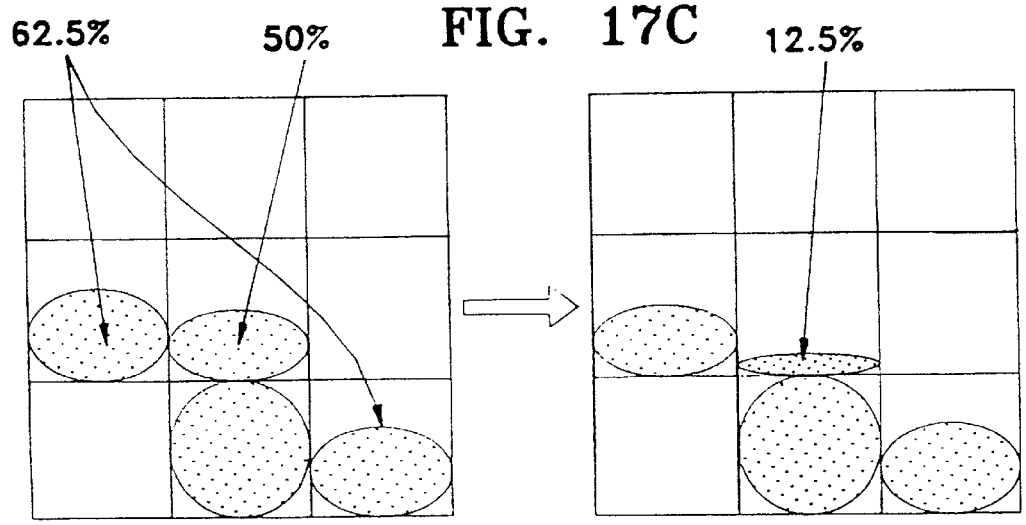

FIGS. 17A–17C show examples of downward-oriented dots among the processing results of the 3×3 sample window corresponding to Group C in the second processor 930. In FIG. 17A, when pixel p[2][2] is a 0% pixel in case of M31 and M41, a 25% pixel is filled in pixel p[2][2], to make for a smoother pixel transition. In FIG. 17B, when pixel p[2][2] is a 0% pixel, and pixels p[3][2] and p[3][3] in the case of M31 are both 100%, a 25% pixel is filled in pixel p[2][2]. In FIG. 17C, when pixel p[2][2] is 50% in case of M31, pixel p[3][2] is 100%, pixel p[3][3] is 62.5%, pixel p[3][3] has a large variation with respect to the center pixel p[2][2]. Accordingly, pixel p[2][2] needs to be reduced from 62.5% to 12.5%.

Figure 18:
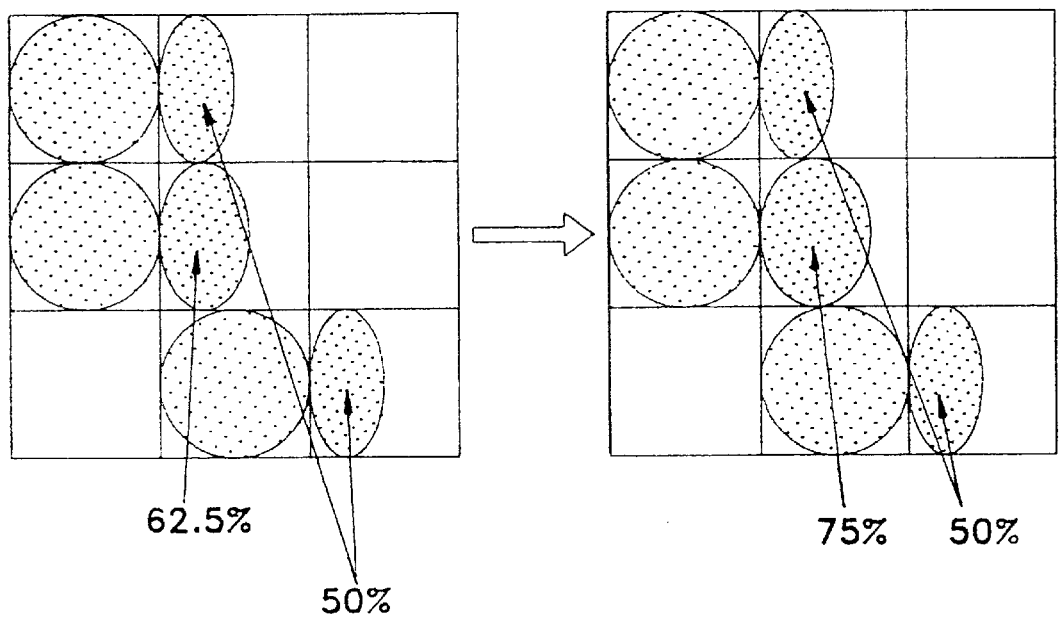
FIG. 18 shows a pattern diagram of the Group-D results of the first processor and the second processor of FIG. 9.

Group D is a pattern to modify a pixel modified into a 62.5% pixel through the first processing into a 75% pixel to reduce a variation width between pixels. Pixel data is classified into Group D when one y equals 1 and the other equals 2 among M1y and M2y while one y equals 2 and the other equals 0 among M3y and M4y, and when one y equals 0 and the other equals 2 among M3y and M4y and one y equals 0 and the other equals 2 among M1y and M2y while one y equals 1 and the other equals 2 among M3y and M4y. FIG. 18 shows the processing result of the Group D. In FIG. 18, the density of the center pixel p[2][2] is changed from a left 62.5% to a left 75%, as a processing result with respect to cases when y=1 in M1y, y=2 in M2y, y=2 in M3y and y=0 in M4y.

Group E is processed using the bitmap pattern of each pixel and the resultant direction and density information of first processor 920, as in Table 3, instead of using the Mxy value.

Figure 19A:
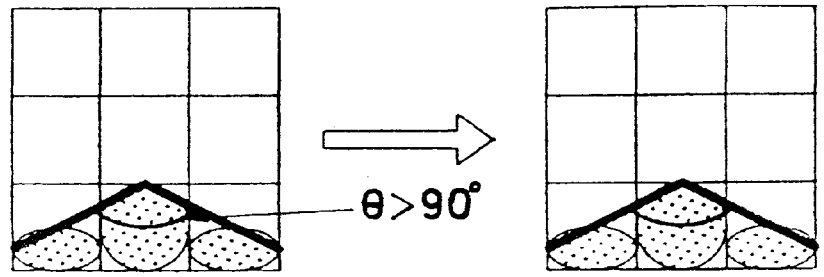
FIGS. 19A–19C show pattern diagrams of the Group-E results of the second processors of FIG. 9.
Figure 19B:
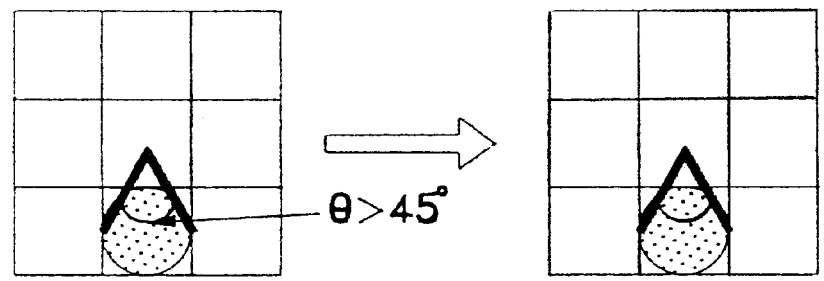
Figure 19C:
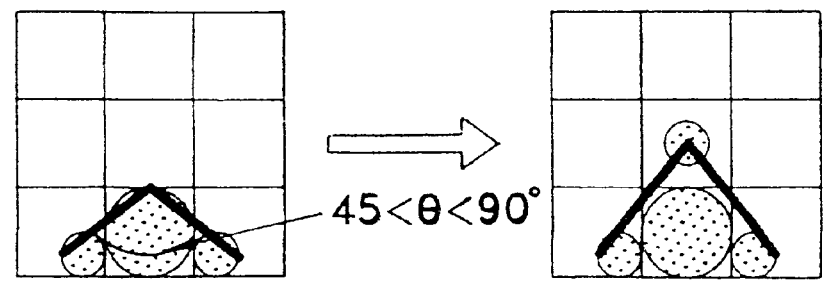

FIGS. 19A–19C show processing results with respect to Group E, i.e., an acute angle between 45° and 90°. Here, since an acute angle of not more than 45° is an end portion of the line or shows up in a gothic font, it is not processed. Table 3 is a logic table of the processing of Group E. The Group E is logically processed by Table 3.

TABLE 3

| | bitmap | | | | | | | | | output data | | | | | | | group |
|---|---|---|---|---|---|---|---|---|---|---|---|---|---|---|---|---|---|
| Class | 11 | 12 | 13 | 21 | 22 | 23 | 31 | 32 | 33 | D6 | D5 | D4 | D3 | D2 | D1 | D0 | |
| gothic_l | 0 | 0 | 0 | 1 | 0 | 0 | 0 | 0 | 0 | 1 | 0 | 1 | 1 | 1 | 0 | 0 | E |
| gothic_r | 0 | 0 | 0 | 0 | 0 | 1 | 0 | 0 | 0 | 1 | 0 | 1 | 1 | 1 | 0 | 0 | E |

TABLE 3-continued

| | bitmap | | | | | | | | output data | | | | | | | group |
|---|---|---|---|---|---|---|---|---|---|---|---|---|---|---|---|---|
| Class | 11 | 12 | 13 | 21 | 22 | 23 | 31 | 32 | 33 | D6 | D5 | D4 | D3 | D2 | D1 | D0 | E |
| gothic_t | 0 | 1 | 0 | 0 | 0 | 0 | 0 | 0 | 0 | 1 | 0 | 1 | 1 | 1 | 0 | 0 | E |
| gothic_b | 0 | 0 | 0 | 0 | 0 | 0 | 0 | 1 | 0 | 1 | 0 | 1 | 1 | 1 | 0 | 0 | E |

NOTE:
gothic__l ← [(p11[D2, D1] = 01) or (p31[D2, D1] = 01)],
gothic__r ← [(p13[D2, D1] = 01) or (p33[D2, D1] = 01)],
gothic__t ← [(p11[D2, D1] = 01) or (p13[D2, D1] = 01)], and
gothic__b ← [(p31[D2, D1] = 01) or (p33[D2, D1] = 01)].

In the above Table 3, if θ>45°, then gothic__l=1 (left); if θ>45°, then gothic__r=1 (right); if θ>45°, then gothic__t=1 (top); and if θ>45°, then gothic__b=1 (bottom).

When an angle between pixel dots is determined as an acute angle, a center 50% pixel is filled in the position of the pixel p[2][2], to increase sharpness of the acute angle.

The Group F modifies the density of a pixel to support the toner-saving mode. The pattern of the Group F is determined to save the toner used for a printer while not affecting a function of improving the whole font quality by comparing the input bitmap data of the pixels p[1][1], p[1][2], p[1][3], p[2][1], p[2][2], p[2][3], p[3][1], p[3][2] and p[3][3] since the toner-saving mode supports three cases of 50%, 75% and 100%. In the cases of the 50%, 75% and 100% toner-saving modes, a 100% pixel is modified into a center pixel having a 50% density (a center 50% pixel), a left-center 25% pixel and a 0% pixel, respectively. Accordingly, the toner consumed for printing can be saved while excluding an edge line portion to which a font quality function is applied.

Figure 20:
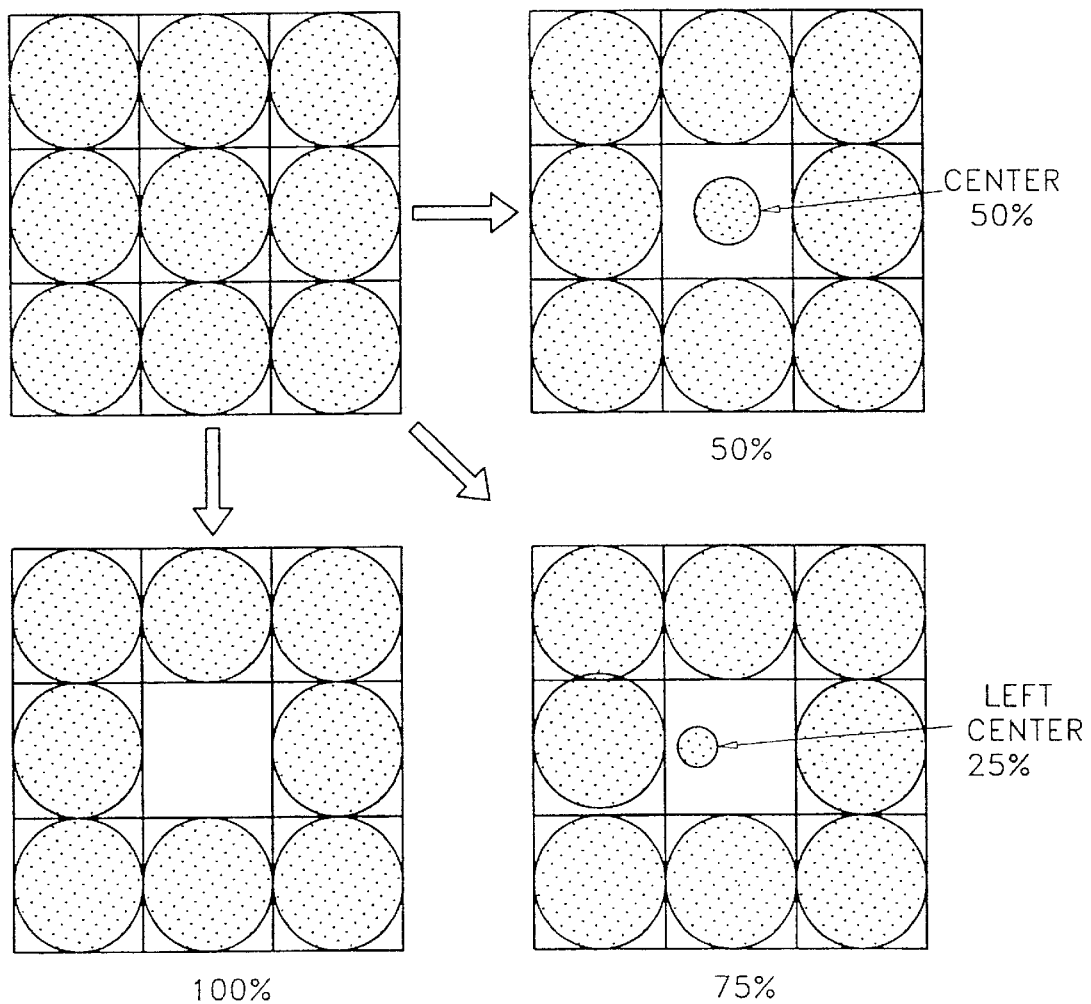
FIG. 20 shows pattern diagrams of the Group-F results of the first and second processors of FIG. 9.

FIG. 20 shows a processing result of the Group F. Whether the toner-saving mode is applied is determined from position of the input bitmap data. As shown in FIG. 20, an application range of the toner-saving mode is determined based on the nine input bitmap data of the 3×3 window.

The Group G shows a case of modifying a center 50% pixel into an LR 75% pixel or a TB 75% pixel in the second processor, in order to process a curved portion in smooth form when the input bitmap data is modified from a 0% pixel into a center 50% pixel in the processing result of the first processor although the input bitmap data pixel is not in an inclined portion.

Figure 21A:
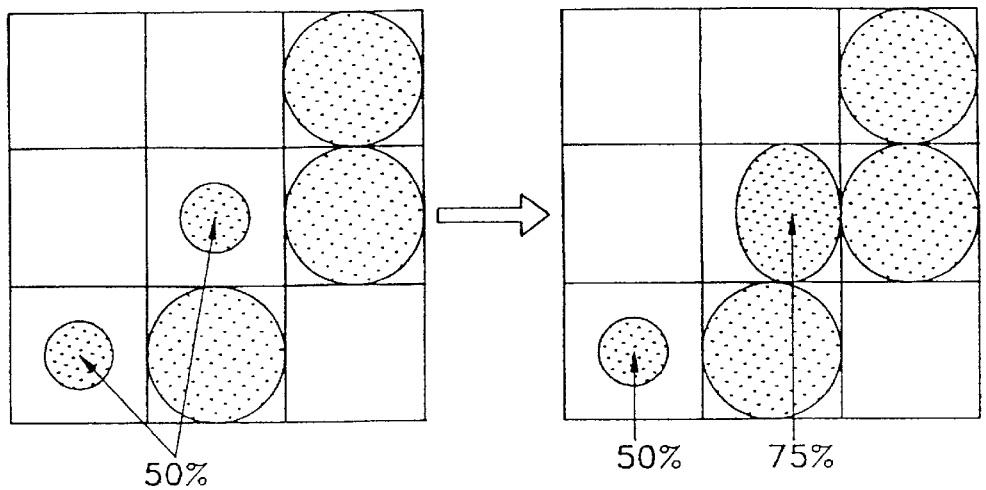
FIGS. 21A and 21B show pattern diagrams of the Group-G results of the first and second processors of FIG. 9.
Figure 21B:
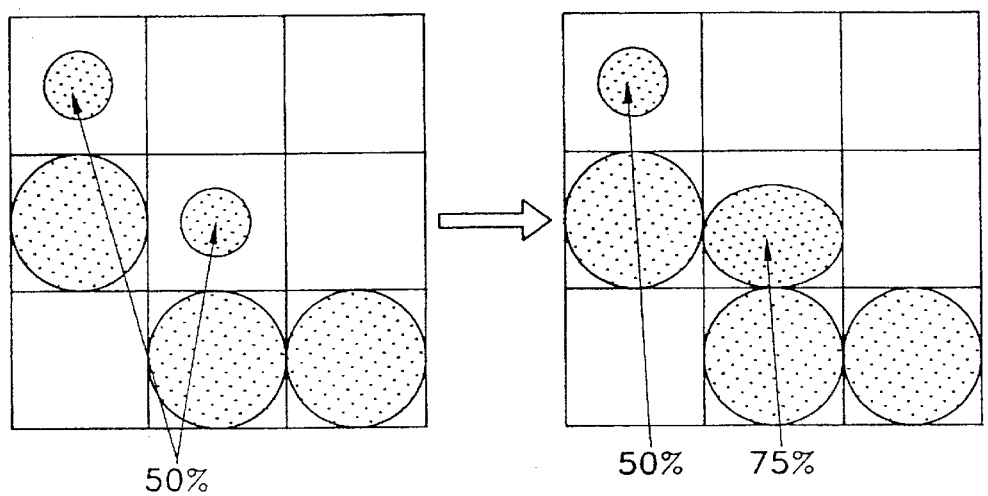

The Group G patterns are shown in FIGS. 21A and 21B. In FIG. 21A, a curved portion is processed in smooth form by modifying the density and the direction of the p[2][2] pixel into a right 75% pixel when M10, M22, M30 and M42 are maintained and the density of the p[2][2] pixel is a center 50%. In FIG. 21B, the center 50% pixel is modified into a TB 75% pixel.

The Group H shows a case of modifying a pixel having a 50% density resulting from the processing result of the first processor into a R/L 25% density pixel to reduce a variation width between the pixels. The Group H is applied to a case where a pattern of variation in a curved line is smooth.

Figure 22:
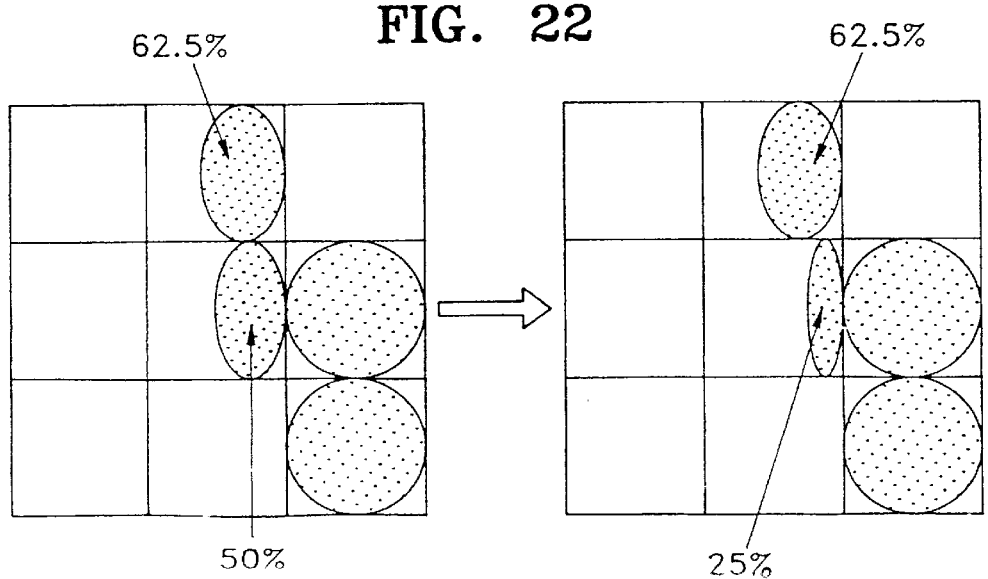
FIGS. 22 shows a pattern diagram of the Group-H results of the first and second processors of FIG. 9.

In a processing pattern of the Group H shown in FIG. 22, a curved portion is processed in smooth form by modifying the density of the p[2][2] pixel from a right 50% into a right 25% when the density of the p[1][2] pixel is 62.5%, the density of the p[3][2] pixel is 0%, the density of the p[2][1] pixel is 0%, and the density of the p[2][3] pixel is 100%.

Figure 23:
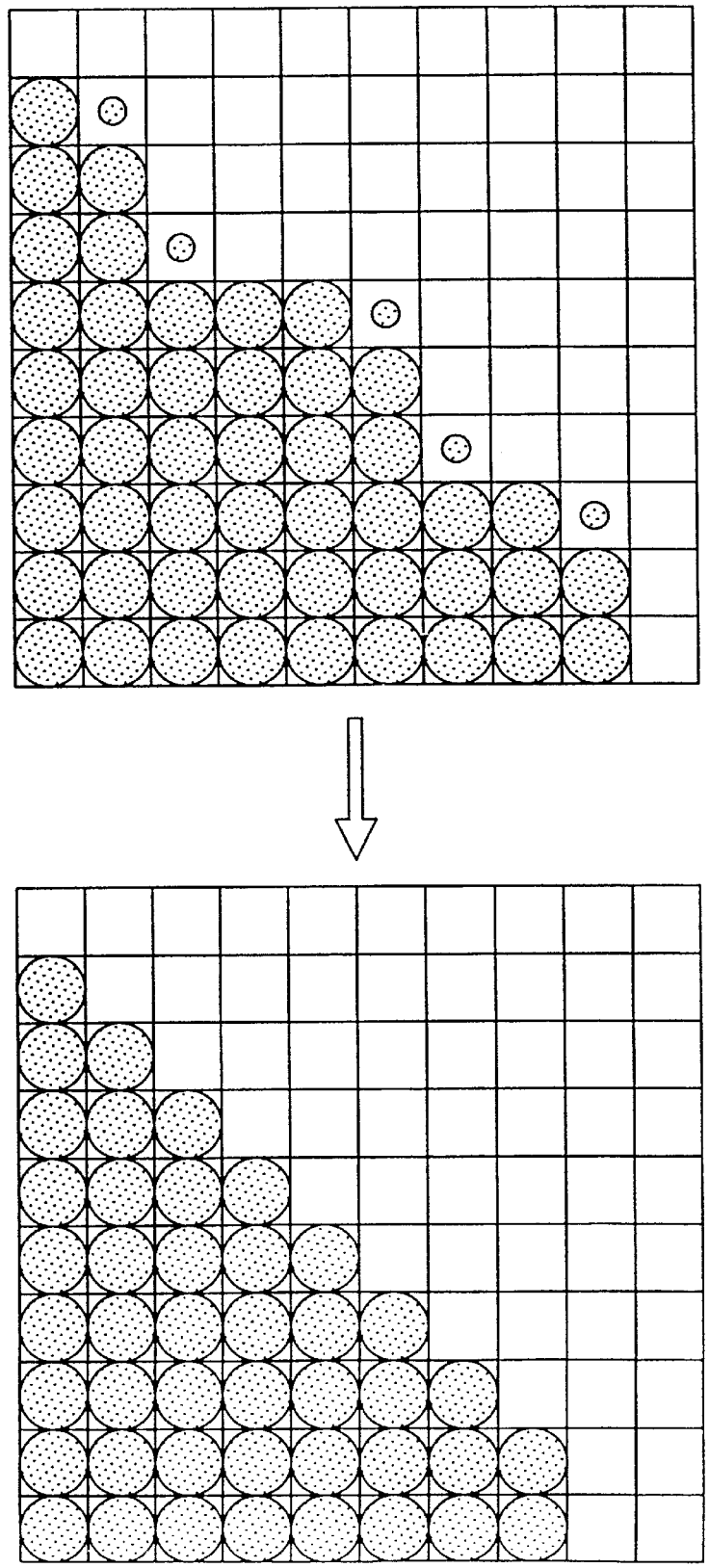
FIG. 23 shows a pattern diagram of the Group-I results of the first and second processors of FIG. 9.

In a processing pattern of the Group I shown in FIG. 23, data is received from the mask patterns 33–40 in the first processing, and smoothens a three-step font, in which a 100% pixel is modified into a 0% pixel and a 0% pixel is modified into a 100% pixel to smoothen the data.

Figure 24:
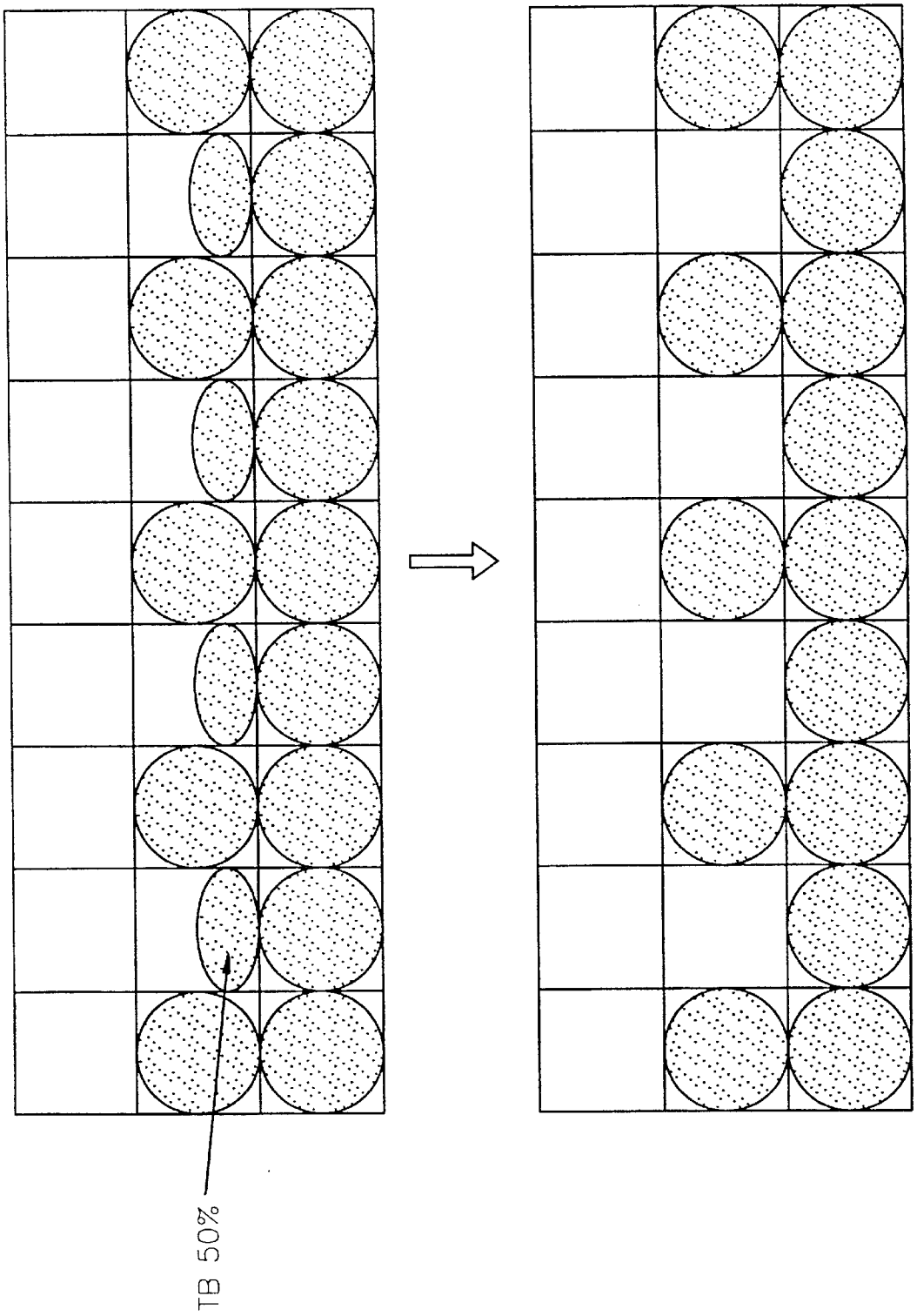
FIG. 24 shows a pattern diagram of the Group-J results of the first and second processors of FIG. 9.

In a processing pattern of the Group J shown in FIG. 24, a graphic pattern is corrected to continuously represent a groove shape.

Figure 25:
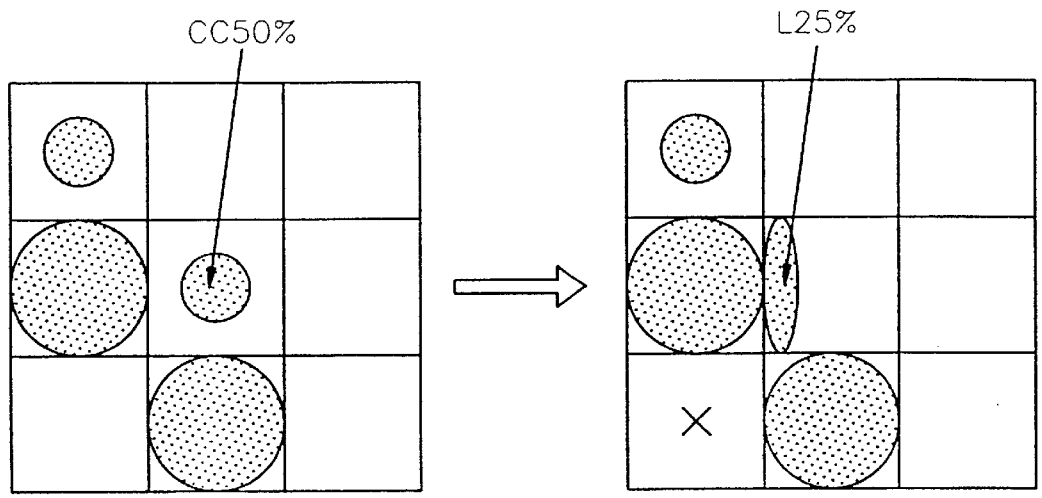
FIG. 25 shows a pattern diagram of the Group-K results of the first and second processors of FIG. 9.

In a processing pattern of the Group K shown in FIG. 25, a corner pixel modified into CC 50% in the result of the first processing is modified into TB or R/L 25% pixel to smoothly connect external edge curve.

Figure 26:
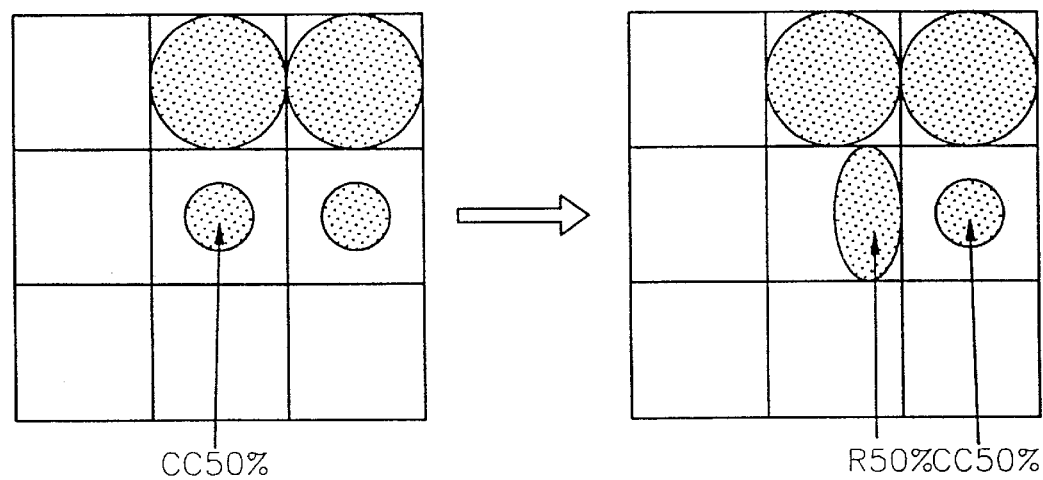
FIG. 26 shows a pattern diagram of the Group-L results of the first and second processors of FIG. 9.

In a processing pattern of the Group L shown in FIG. 26, a two-step outer angle dot pattern modified in CC 50% is modified into R/L 50% pixel in the Group E, although portions should be sharply indicated as in the Group E.

Figure 27:
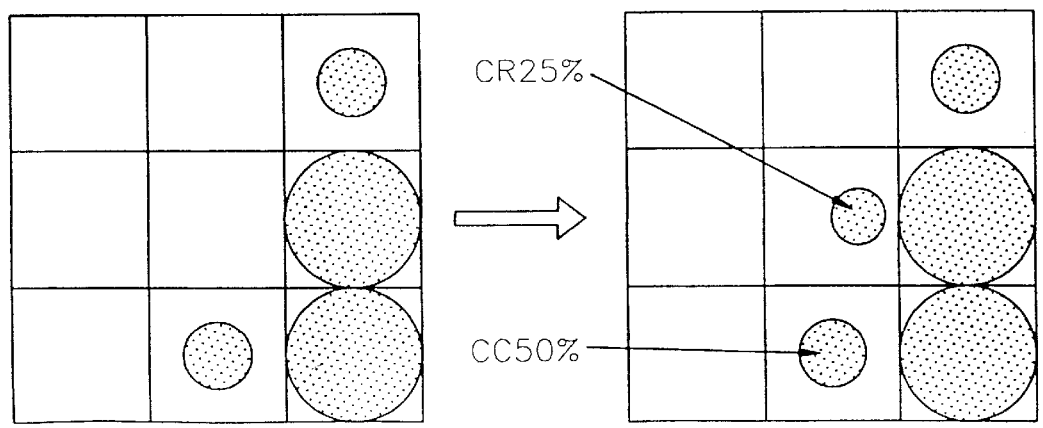
FIG. 27 shows a pattern diagram of the Group-M results of the first and second processors of FIG. 9.

In a processing pattern of the Group M shown in FIG. 27, a three-step dot pattern is processed to remove the one-step in the second processing since the three-step is changed into the one-step processing pattern, in which a CL or CR 25% pixel is added to the center of the three-step pattern.

When the pixel dot pattern does not belong to Groups A to M, an output result of the second step processing becomes the output result Dp[2][2] of the first step processing.

Figure 28:
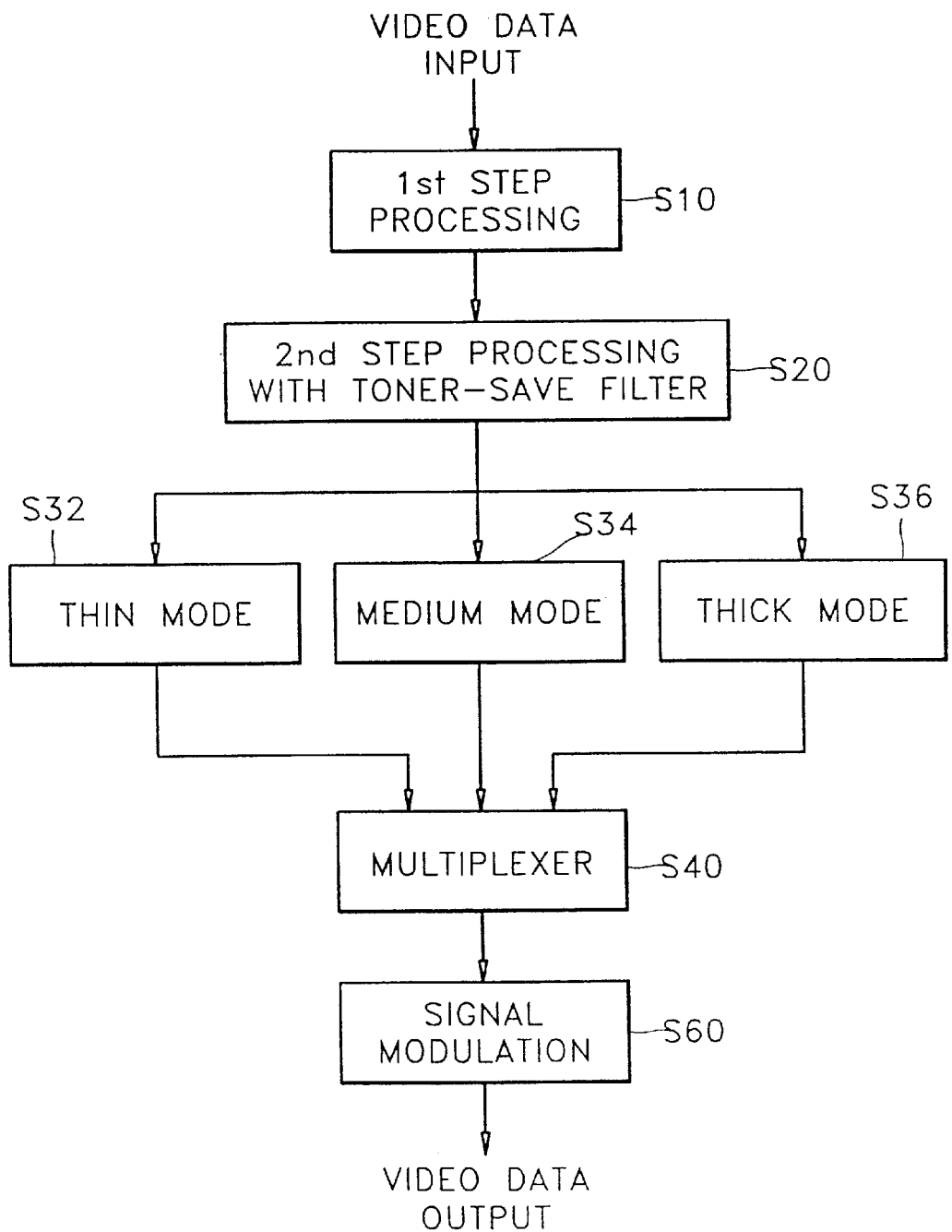
FIG. 28 is a flowchart-like diagram for explaining a resolution enhancing method according to the present invention.

FIG. 28 is a flowchart-like diagram showing the whole procedure of the a resolution enhancement method according to the present invention which can properly perform a toner-saving mode function. In FIG. 28, input bitmap data is passed through a first processor in step S10. Thereafter, the firstly processed result is passed through a second processor having a toner-saving filter to generate a toner-saving pattern in step S20. Then, the secondly processing result is selected as a thickness adjustment mode in steps S32, S34 and S36, respectively. The selected thickness adjustment mode is output in step S40, to complete a toner-saving mode. Then, the thickness adjusted data is passed through a signal modulation procedure to output a desired modulation signal in step S60.

Figure 30A:
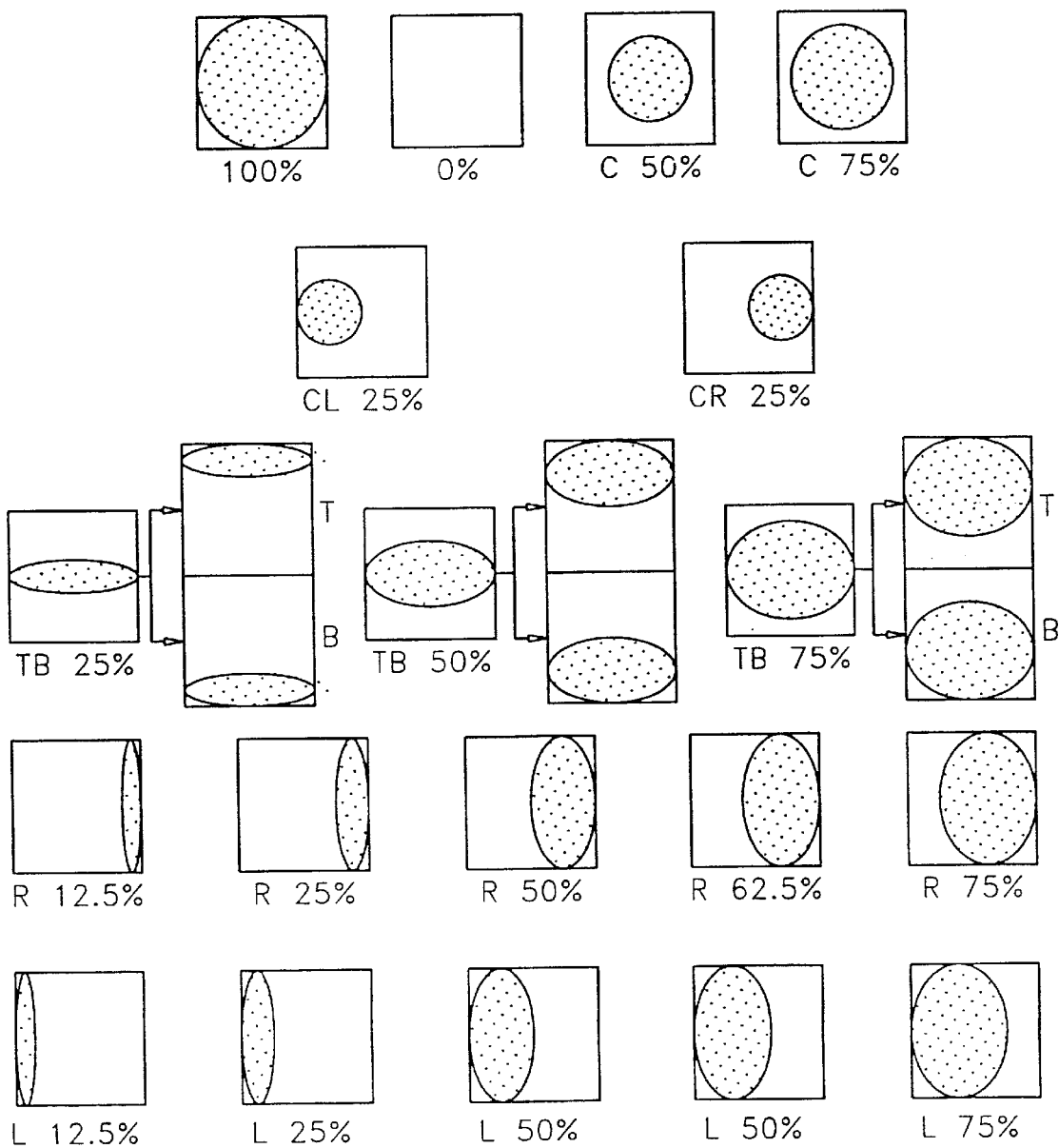
FIGS. 30A and 30B show examples of dot modulation in the "8" and "4" modes, respectively, according to the embodiment of FIG. 9.
Figure 30B:
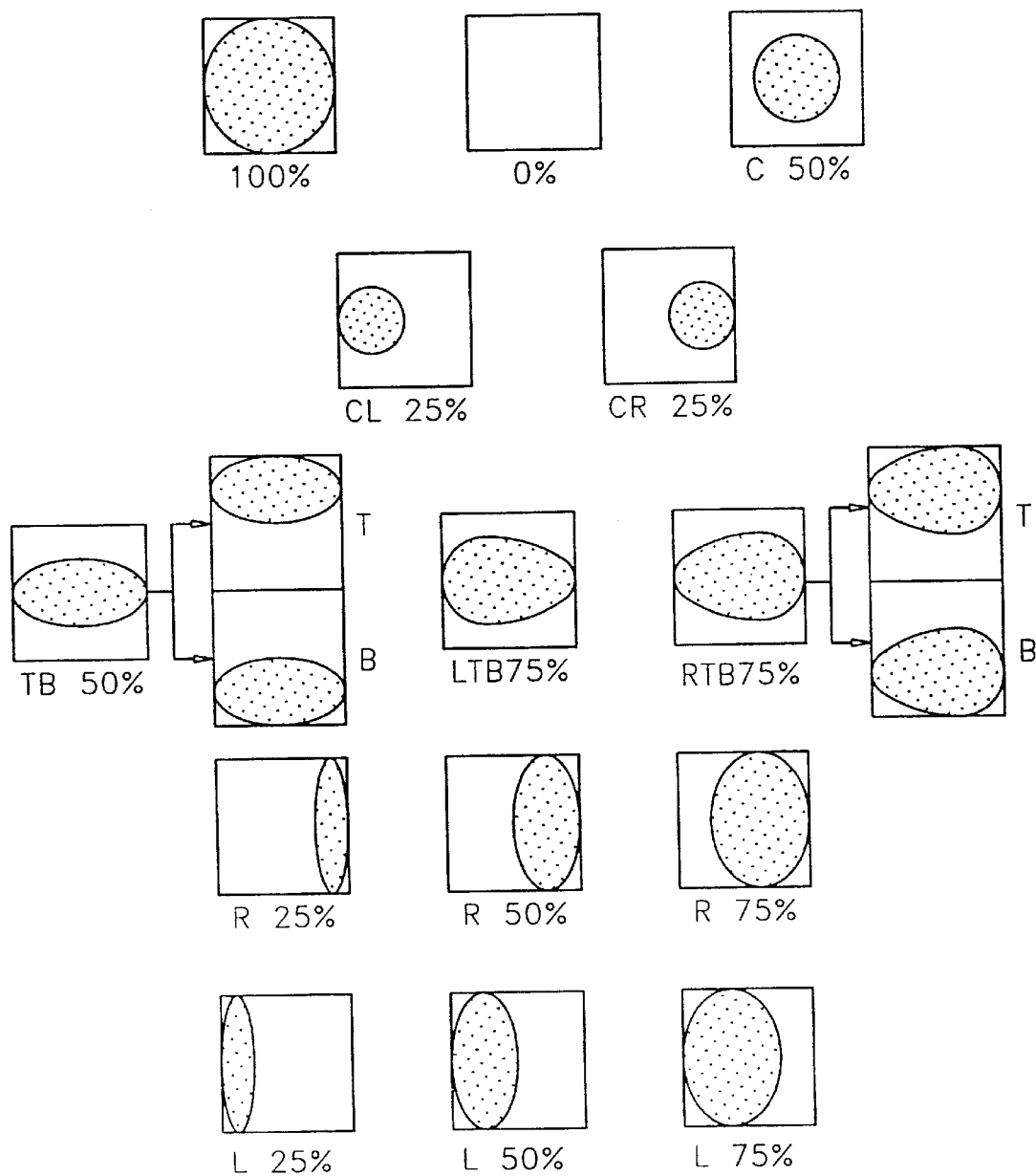

The signal modulator 940 of FIG. 9 determines the pattern of modulation according to the result of second processing portion 930 and produces a modulated signal. Table 4 represents the output result of the second processing portion 930 and the modulation shape determined according to a thickness flag and 4/8-mode flag. D6 (D0–D5) represents input bitmap data. In Table 4, the DF(T+1) value becomes "1" when the density is 100% or TB75% and DF(T)=1. In 4-mode operation, TB75% and TB50% has two kinds of modulation patterns according to the DF(T) value. In 8-mode operation, TB25% and TB50% has two kinds of modulation patterns according to the DF(T) value. That is, the variable DF (decrease flag) is a flag for processing TB25%, TB50% and TB75% when the magnitude of a pixel is gradually decreased or increased. Various modulated signals with respect to 8-mode and 4-mode operations are shown in FIG. 29A and 29B, respectively. In 4-mode operation, the LTB75% modulation signal stipulates that the following pixel density is smaller than the current pixel density and more driving pulses are given to the previous pixel as in FIG. 29B. Also, in FIG. 29A, in the case of left 75%, since six system clock pulses are given for each half-cycle of the pixel clock period, a driving signal is given to the left by 75%. Since the other waveforms in FIG. 29A are apparent to the skilled artisan, the detailed descriptions thereof will be omitted. FIG. 29A shows the 8-mode case in which eight system pulses correspond to each pixel clock pulse, while FIG. 29B shows the 4-mode case in which four system clock pulses correspond to one pixel clock pulse. In FIG. 29B, in the case of the RTB or LTB 75%, since, as above, two system clock pulses are given to the left and one system clock pulse is given to the right as a driving signal, for each half-cycle of the pixel clock period. Otherwise, one system clock pulse is given to the left and two system clock pulses are given to the right as a driving signal, for each half-cycle of the pixel clock period. The driving signal occupies 75% of one pixel clock pulse in a decreasing form from the left. FIGS. 30A and 30B shows an example of dot modulation in 8-mode and 4-mode operations, respectively. FIG. 30A shows the dot modulation based on the waveform diagram of the 8-mode signal modulator shown in FIG. 30A, while FIG. 30B shows the dot modulation based on the waveform diagram of the 4-mode signal modulator shown in FIG. 30B. It can be seen from FIGS. 30A and 30B that the 8-mode dot modulation can obtain about 50% improvement of the resolution compared with that of the 4-mode dot modulation. However, since the 8-mode dot modulation can make the system more complicated and operate more slowly than does the 4-mode dot modulation. Accordingly, it is preferable that both mode dot modulations be used by proper combination. In the case of the top or bottom pixels, 75%, 50% and 25% pixels can be embodied in the 8-mode, while 75% and 50% pixels can be embodied in the 4-mode, of which the modulation pattern is limited in comparison with the cases of the left and right directions. Concerning the density values which cannot be embodied due to the limited modulation pattern of the top or bottom direction, the pixels have the closest density value available. When there exist three "closest" density values, a thickness flag (TF), that is, a flag representing thickness, is used. Thus, when the TF value is "1," printing is performed in the density of the thicker side, while when the TF value is "0," the printing is performed in the density of the thinner side. When the TF value is "medium," the printing is performed in the density of the medium side.

TABLE 4

| bit-map | DF(t) pixel data | | | | | | DF (T) | 8-mode | | | 4-mode | | |
|---|---|---|---|---|---|---|---|---|---|---|---|---|---|
| | D5 | D4 | D3 | D2 | D1 | D0 | | thin | medium | thick | thin | medium | thick |
| X | 0 | 0 | 0 | 0 | 1 | 0 | X | CR25 | CR25 | CR25 | CR25 | CR25 | CR25 |
| X | 0 | 0 | 1 | 0 | 1 | 0 | X | CL25 | CL25 | CL25 | CL25 | CL25 | CL25 |
| 1 | X | X | X | 0 | 0 | 0 | X | 100 | 100 | 100 | 100 | 100 | 100 |
| 0 | X | X | X | 0 | 0 | 0 | X | 0 | 0 | 0 | 0 | 0 | 0 |
| X | 0 | 1 | 1 | 1 | 0 | 0 | 0 | CR25 CL25 | CC50 | CC75 | LTB50 RTB50 | RTB50 LTB50 | CC50 |
| X | 0 | 1 | 0 | 0 | 0 | 1 | 0 1 | 0 | TB25 | CR25 CL25 | CR25 CL25 | CR25 CL25 | CR25 CL25 |
| X | 0 | 1 | 0 | 0 | 1 | 0 | 0 1 | LTB50 RTB50 | LTB50 RTB50 | LTB50 RTB50 | LTB50 RTB50 | RTB50 LTB50 | CC50 |
| X | 0 | 1 | 0 | 1 | 0 | 0 | 0 1 | LTB25 RTB25 | TB50 RTB75 | TB50 LTB75 | LTB75 RTB75 | RTB75 LTB75 | LTB75 RTB75 |
| X | 0 | 1 | 0 | 1 | 0 | 1 | 0 | TB50 | TB75 | TB75 | RTB75 LTB75 | RTB75 LTB75 | LTB75 RTB75 |
| X | 0 | 1 | 0 | 1 | 0 | 1 | 1 | | | | LTB75 | LTB75 | RTB75 |
| X | 0 | 1 | 0 | 1 | 1 | 0 | 0 | TB75 | TB75 | TB75 | LTB75 | RTB75 | LTB75 |
| X | 0 | 1 | 0 | 1 | 1 | 0 | 1 | | | | RTB75 | LTB75 | RTB75 |
| X | 1 | 0 | 0 | 0 | 1 | 0 | X | 0 | R12.5 | R25 | 0 | R25 | R25 |
| X | 1 | 0 | 0 | 0 | 1 | 0 | X | R12.5 | R25 | R50 | R25 | R25 | R50 |
| X | 1 | 0 | 0 | 1 | 0 | 0 | X | R25 | R50 | R62.5 | R25 | R50 | R50 |
| X | 1 | 0 | 0 | 1 | 0 | 1 | X | R50 | R62.5 | R75 | R50 | R50 | R75 |
| X | 1 | 0 | 0 | 1 | 1 | 0 | X | R50 | R75 | R75 | R50 | R75 | R75 |
| X | 1 | 1 | 0 | 0 | 1 | 0 | X | 0 | L12.5 | L25 | 0 | L25 | L25 |
| X | 1 | 1 | 0 | 0 | 1 | 0 | X | L12.5 | L25 | L50 | L25 | L25 | L50 |
| X | 1 | 1 | 0 | 1 | 0 | 0 | X | L25 | L50 | L62.5 | L25 | L50 | L50 |
| X | 1 | 1 | 0 | 1 | 0 | 1 | X | L50 | L62.5 | L75 | L50 | L50 | L75 |
| X | 1 | 1 | 0 | 1 | 1 | 0 | X | L50 | L75 | L75 | L50 | L75 | L75 |
| X | 0 | 1 | 1 | 0 | 1 | 1 | X | CC50 | CC50 | CC50 | CC50 | CC50 | CC50 |
| 1 | X | X | X | 1 | 1 | 1 | X | 0 | 0 | 0 | 0 | 0 | 0 |
| 0 | X | X | X | 1 | 1 | 1 | X | 100 | 100 | 100 | 100 | 100 | 100 |

As an example of the first processing and the second processing, a complete processing example is shown in FIGS. 31A–31F. A dot pattern of a 5×5 sample window prior to being processed, a dot pattern after processing in the first processor 920, and a dot pattern after processing in the second processor 930 are shown in each of FIGS. 31A–31F.

Figure 31A:
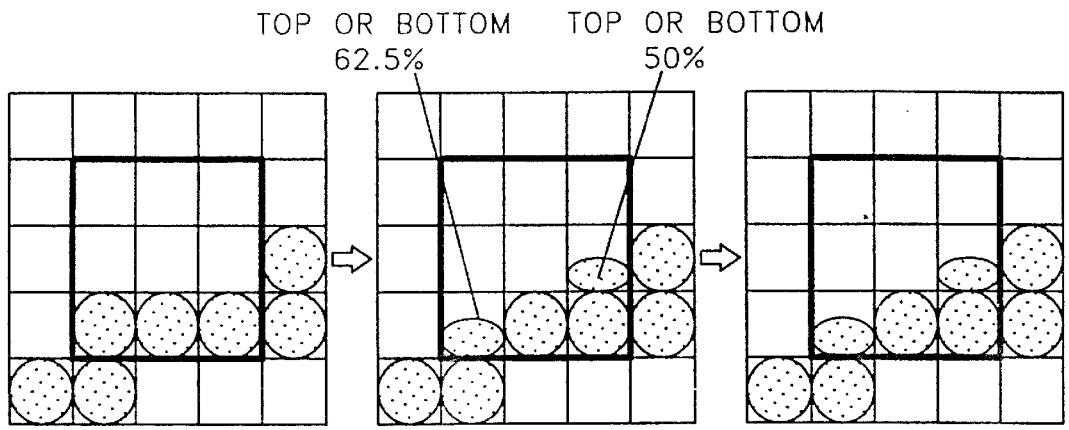
FIGS. 31A–31F each show examples of the results before processing the image data, after firstly processing the image data, and after secondly processing the image data according to each arrangement, when processing a 5×5 sample window according to an embodiment of FIG. 9, respectively.

Referring to FIG. 31A, when reviewing the processing of the 5×5 sample window, since pixel p[2][3] and the peripheral eight pixels in the first processor 920 are consistent with the mask 6 of FIG. 13, the density of the pixel p[2][3] is changed into a top or bottom 50%. Since pixel p[3][1] and the peripheral eight pixels in the first processor 920 are consistent with the mask 18 of FIG. 13, the density of the pixel p[3][1] is changed into a top or bottom 62.5%. Since pixels p[1][1], p[1][2], p[1][3], p[2][1], p[2][2], p[3][2] and p[3][3] do not belong to any masks of the first processor 920, the data values are all "0." The result is shown in Table 5a. In Table 5a, each box represents the output value of the first processing stage. Since the M values obtained by the second processor 930 are M10, M20, M31 and M42, the pixels do not belong to any group. Thus, the second processing stage does not further process the result of the first processing stage.

TABLE 5a (output of FIG. 31A)

| p[1][1]<br>D5=0, D4=0,<br>D2=0, D1=0 | p[1][2]<br>D2=0, D1=0 | p[1][3]<br>D5=0, D4=0,<br>D2=0, D1=0 |
|---|---|---|
| p[2][1]<br>D2=0, D1=0 | p[2][2]<br>D5=0, D4=0, D3=0,<br>D2=0, D1=0, D0=0 | p[2][3]<br>D2=1, D1=0 |
| p[3][1]<br>D5=0, D4=1,<br>D2=1, D1=0 | p[3][2]<br>D2=0, D1=0 | p[3][3]<br>D5=0, D4=0,<br>D2=0, D1=0 |

Figure 31B:
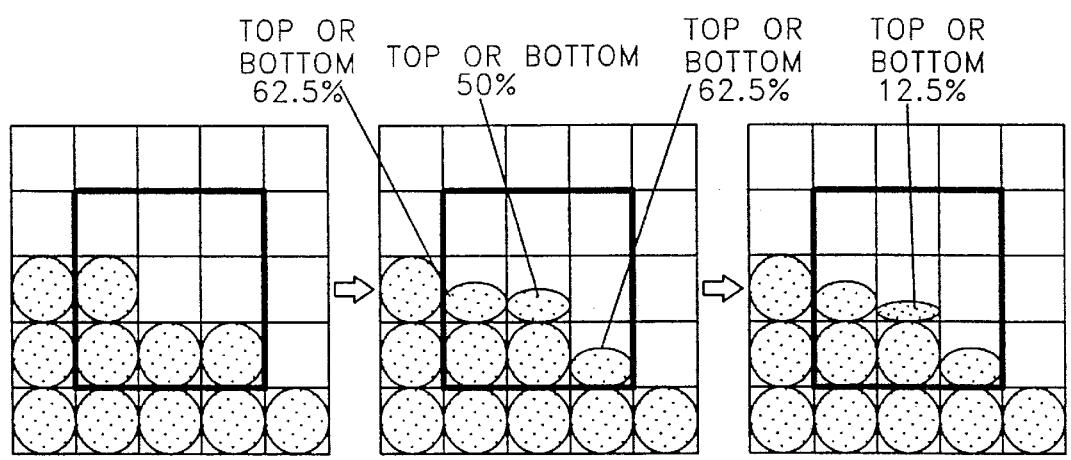

Referring to FIG. 31B, when reviewing the processing of the 5×5 sample window, since pixel p[2][1] and the peripheral eight pixels in the first processor 920 are consistent with the mask 23 of FIG. 13, the pixel data becomes the top or bottom 62.5%, and the D0 value becomes "1," the D1 value becomes "0," the D2 value becomes "1," the D3 value becomes "0," the D4 value becomes "1," and the D5 value becomes "0." Since pixel p[2][2] and the peripheral eight pixels in the first processor 920 are consistent with the mask 11 of FIG. 13, the pixel data becomes the top or bottom 50%. Since pixel p[3][3] is consistent with the mask 23, the pixel data becomes the top or bottom 62.5%. Since pixels p[1][1], p[1][2], p[1][3], p[2][3], p[3][1] and p[3][2] do not belong to any masks of the first processor 920, the data values are all "0." The result is shown in Table 5b. In Table 5b, each box represents the output value of the first processing stage. Since the M values obtained by the second processor 930 are M10, M22, M31 and M40, the pixel data corresponds to Group C. As a result, the variation from pixels p[2][1] to p[3][3] is more severe. Thus, pixel p[2][2] is processed as 12.5% to smoothen the whole shape of the pixel pattern.

TABLE 5b (output of FIG. 31B)

| p[1][1]<br>D5=0, D4=0,<br>D2=0, D1=0 | p[1][2]<br>D2=0, D1=0 | p[1][3]<br>D5=0, D4=0,<br>D2=0, D1=0 |
|---|---|---|
| p[2][1]<br>D2=1, D1=0 | p[2][2]<br>D5=0, D4=1, D3=0,<br>D2=1, D1=0, D0=0 | p[2][3]<br>D2=1, D1=0 |
| p[3][1]<br>D5=0, D4=0,<br>D2=0, D1=0 | p[3][2]<br>D2=0, D1=0 | p[3][3]<br>D5=0, D4=1,<br>D2=1, D1=0 |

Figure 31C:
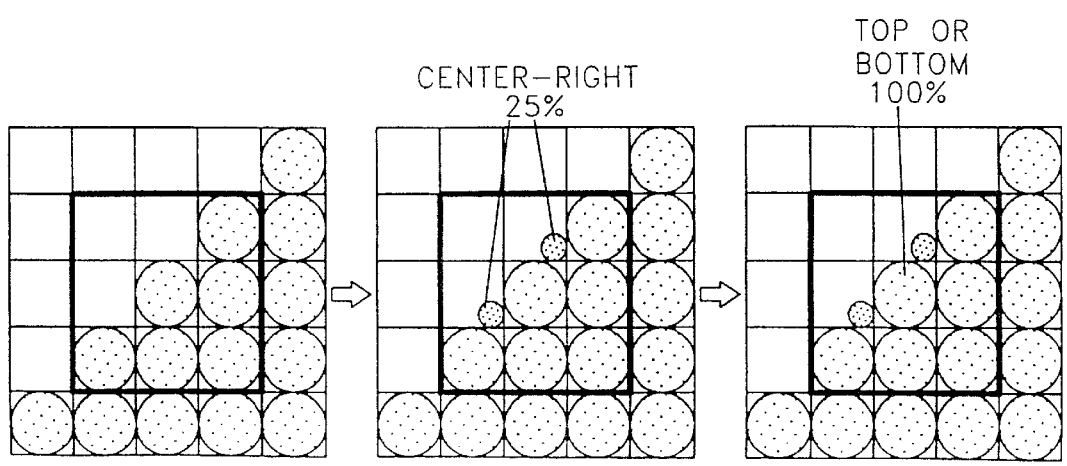

Referring to FIG. 31C, when reviewing the processing of the 5×5 sample window, since pixels p[1][2] and p[2][1] and the peripheral eight pixels in the first processor 920 are consistent with the mask 13 of FIG. 13, the pixel data becomes the right center 50%. Since pixels p[1][1], p[1][3], p[2][2], p[2][3], p[3][1], p[3][2] and p[3][3] do not belong to any masks of the first processor 920, the data values are all "0." The result is shown in Table 5c. In Table 5c, each box represents the output value of the first processing stage. Since the M values obtained by the second processor 930 are M11, M22, M31 and M42, the pixel data corresponds to Group B and has a value of 100%.

TABLE 5c (output of FIG. 31C)

| p[1][1]<br>D5=0, D4=0,<br>D2=0, D1=0 | p[1][2]<br>D2=0, D1=1 | p[1][3]<br>D5=0, D4=0,<br>D2=0, D1=0 |
|---|---|---|
| p[2][1]<br>D2=0, D1=0 | p[2][2]<br>D5=0, D4=0, D3=0,<br>D2=0, D1=0, D0=0 | p[2][3]<br>D2=0, D1=0 |
| p[3][1]<br>D5=0, D4=0,<br>D2=0, D1=0 | p[3][2]<br>D2=0, D1=1 | p[3][3]<br>D5=0, D4=0,<br>D2=0, D1=0 |

Figure 31D:
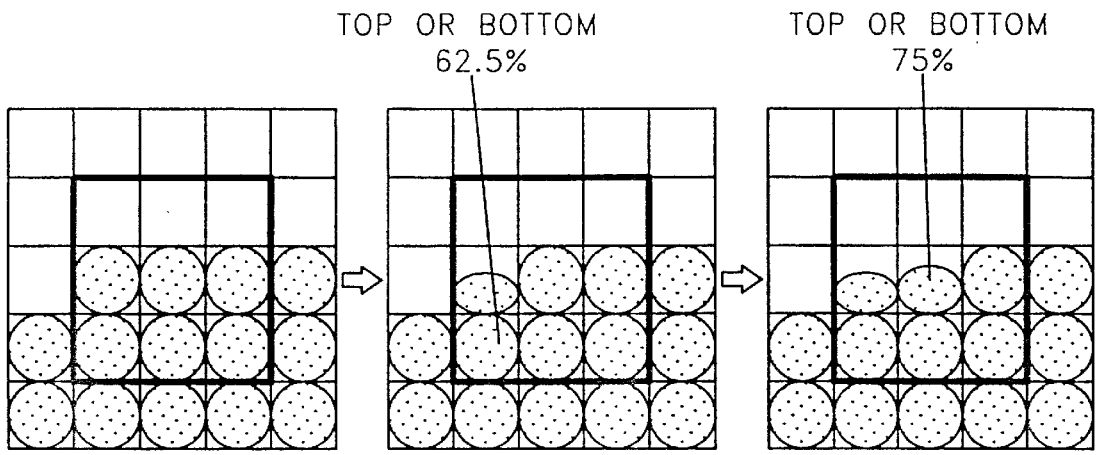

Referring to FIG. 31D, when reviewing the processing of the 5×5 sample window, since pixels p[2][1] and the peripheral eight pixels in the first processor 920 are consistent with the mask 18 of FIG. 13, the pixel data becomes the top or bottom 62.5%, and the D0 value becomes "1," the D1 value becomes "0," the D2 value becomes "1," the D3 value becomes "0," the D4 value becomes "1," and the D5 value becomes "0." Since pixels p[1][1], p[1][2], p[1][3], p[2][2], p[2][3], p[3][1], p[3][2] and p[3][3] do not belong to any masks of the first processor 920, the data values are all "0." The result is shown in Table 5d. In Table 5d, each box represents the output value of the first processing stage. Since the M values obtained by the second processor 930, the values of M10, M22, M31 and M42, the pixel data corresponds to Group A and has a value of the top or bottom 75%.

TABLE 5d (output of FIG. 31D)

| p[1][1]<br>D5=0, D4=0,<br>D2=0, D1=0 | p[1][2]<br>D2=0, D1=0 | p[1][1]<br>D5=0, D4=0,<br>D2=0, D1=0 |
|---|---|---|
| p[2][1]<br>D2=1, D1=0 | p[2][2]<br>D5=0, D4=0, D3=0,<br>D2=0, D1=0, D0=0 | p[2][3]<br>D2=0, D1=0 |
| p[3][1]<br>D5=0, D4=0,<br>D2=0, D1=0 | p[1][1]<br>D5=0, D4=0,<br>D2=0, D1=0 | p[3][3]<br>D5=0, D4=0,<br>D2=0, D1=0 |

Figure 31E:
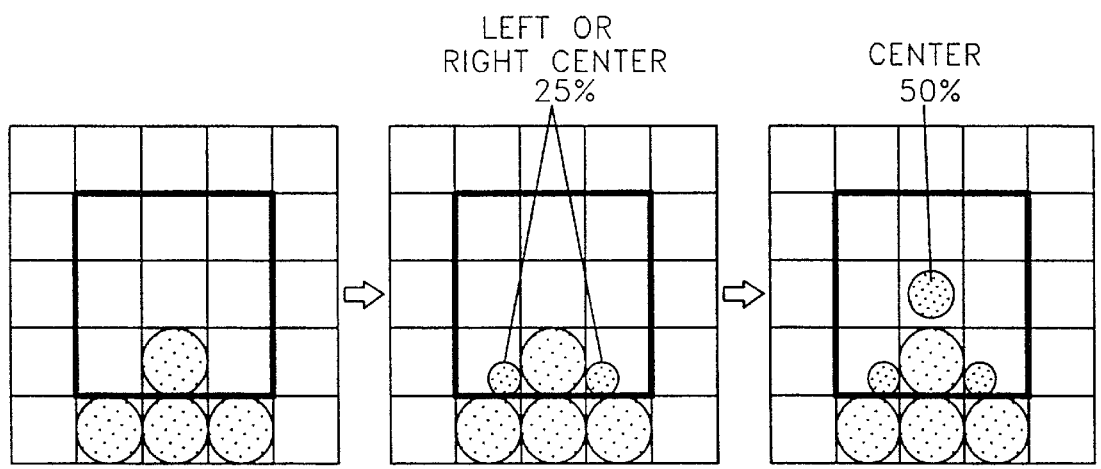

Referring to FIG. 31E, when reviewing the processing of the 5×5 sample window, since pixels p[3][1] and the peripheral eight pixels in the first processor 920 are consistent with the mask 13 of FIG. 13, the pixel data becomes the right center 25%, and since the pixel p[3][3] is consistent with the mask 16, the pixel data becomes the left center 25%. Since pixels p[1][1], p[1][2], p[1][3], p[2][1], p[2][2], p[2][3] and p[3][2] do not belong to any masks of the first processor 920, the data values are all "0." The result is shown in Table 5e. In Table 5e, each box represents the output value of the first processing stage. In the second processor 930, the pixel data is classified into Group E, or forms an acute angle not less than 45° and not more than 90°, a 50% pixel is printed in the center to further sharpen the acute angle.

TABLE 5e (output of FIG. 31E)

| p[1][1]<br>D5=0, D4=0,<br>D2=0, D1=0 | p[1][2]<br>D2=01, D1=0 | p[1][3]<br>D5=0, D4=0,<br>D2=0, D1=0 |
|---|---|---|
| p[2][1]<br>D2=0, D1=0 | p[2][2]<br>D5=0, D4=0, D3=0,<br>D2=0, D1=0, D0=0 | p[2][3]<br>D2=0, D1=0 |
| p[3][1] | p[3][2] | p[3][3] |

TABLE 5e-continued (output of FIG. 31E)

| D5=0, D4=0, D2=0, D1=1 | D2=0, D1=0 | D5=0, D4=0, D2=0, D1=1 |

Figure 31F:
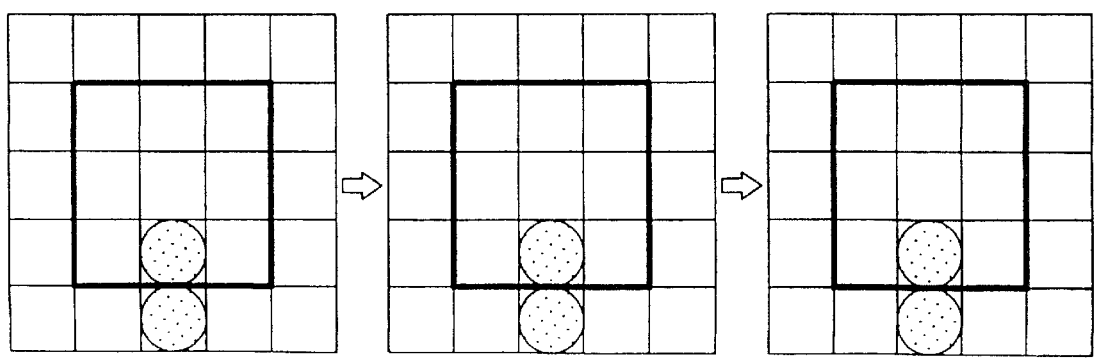

Referring to FIG. 31F, when reviewing the processing of the 5×5 sample window, since pixels p[1][1], p[1][2], p[1][3], p[2][1], p[2][2], p[2][3], p[3][1], p[3][2] and p[3][3] do not belong to any masks of the first processor 920, the data values are all "0." The result is shown in Table 5f. In Table 5f, each box represents the output value of the first processing stage. In the second processor 930, the pixel data belongs to a candidate of Group D. However, since the pixel data forms an angle not more than 45°, it is not processed.

TABLE 5f (output of FIG. 31F)

| p[1][1] D5=0, D4=0, D2=0, D1=0 | p[1][2] D2=0, D1=0 | p[1][3] D5=0, D4=0, D2=0, D1=0 |
| p[2][1] D2=0, D1=0 | p[2][2] D5=0, D4=0, D3=0, D2=0, D1=0, D0=0 | p[2][3] D2=0, D0=0 |
| p[3][1] D5=0, D4=0, D2=0, D1=0 | p[3][2] D2=0, D1=0 | p[3][3] D5=0, D4=0, D2=1, D1=0 |

In the embodiment as described above, after obtaining a 5×5 sample window, the first and second processing operations are performed to improve the resolution. However, it should be apparent to one skilled in the art that there can be several variations and modifications in which, say, a 7×7 or 9×9 sample window is utilized in the same manner. Here, for example, it is noted that when the 7×7 sample window is used, twenty-five 3×3 sample windows are generated, while when the 9×9 sample window is used, forty-nine 3×3 sample windows are generated, in which case, the increased number of processing stages complicates the system. However, it should be appreciated that resolution of the laser printer according to the present invention can be increased using an M×M sample window.

As described above, the resolution enhancement apparatus of the laser printer according to the present invention minimizes the use of memory by using four row line memories, to thereby effectively reduce memory size by 50% that of the conventional art and, at the same time, save production costs. In the present invention, the resolution enhancement is accomplished by expressing finite shapes according to the maximum twenty-three modulation patterns and the twenty-three pixel expression methods, by removing the portion of severe variation of pixel magnitude, which in turn removes the step phenomenon.

What is claimed is:

1. A resolution enhancement apparatus of a laser printer, comprising:

memory means for storing sequentially input image data in a sequential scanning method, for rearranging a scanning line order and for generating an M×M sample window, M being an integer;

first processing means for producing $(M-2)^2$ 3×3 sample windows using the M×M sample window, for determining which mask pattern among a plurality of mask patterns is coincident with each of the produced 3×3 sample windows, and for outputting predetermined data with respect to direction and density of the image data according to the mask pattern;

second processing means for determining to which group among a plurality of groups the image data belongs by using the predetermined data output from said first processing means, and/or altering the image data into predetermined image data corresponding to the group to output altered data for at least one of supporting a toner-saving mode and smoothing the image data; and signal modulation means for modulating the data output from said second processing means into a predetermined pattern and outputting a modulated pattern.

2. The resolution enhancement apparatus of a laser printer according to claim 1, wherein said memory means comprises:

a memory for storing received input image data;

a sample window generator for reading the image data stored in said memory and generating the M×M sample window; and a window controller for controlling said memory and said sample window generator.

3. The resolution enhancement apparatus of a laser printer according to claim 1, wherein said sample window includes 5×5 pixel data when the value of M is five.

4. The resolution enhancement apparatus of a laser printer according to claim 3, wherein said memory means comprises:

a serial-to-parallel converter for converting received serial input data into parallel output data;

row line memory means for storing data supplied from said serial-to-parallel converter;

a first register portion for storing data from said row line memory means and the output of said serial-to-parallel converter so as to have a 5×8 arrangement;

a rearranger for rearranging an arrangement sequence of the output from said first register;

a second register for storing rearranged data so as to have a 5×5 arrangement; and a window controller for controlling said serial-to-parallel converter, said row line memory means, said first register, said rearranger and said second register.

5. The resolution enhancement apparatus of a laser printer according to claim 4, further comprising a demultiplexer for demultiplexing the input data between said serial-to-parallel converter and said row line memory means.

6. The resolution enhancement apparatus of a laser printer according to claim 4, wherein said row line memory means comprises four row line memories for storing one row of data each.

7. The resolution enhancement apparatus of a laser printer according to claim 3, wherein said memory means comprises:

a serial-to-parallel converter for converting received serial input data into parallel output data;

three 8-bit registers for storing data supplied from said serial-to-parallel converter;

three 16-bit registers for expanding the input image data stored in each of said 8-bit registers into 16-bit data and storing the expanded data therein;

a rearranger for rearranging an arrangement sequence of an output from said 16-bit registers;

a 5×5 register for storing rearranged data so as to have a 5×5 arrangement; and a window controller for controlling said serial-to-parallel converter, said 8-bit registers, said 16-bit registers, said rearranger and said 5×5 register.

8. The resolution enhancement apparatus of a laser printer according to claim 7, wherein a read clock frequency of each of said 8-bit registers and a load clock frequency of each of said 16-bit registers are two times a write clock frequency of each of said 8-bit registers.

9. The resolution enhancement apparatus of a laser printer according to claim 8, wherein said first processing means comprises nine processors each receiving 5×5 sample window data, each processor operating simultaneously, independently, and in parallel with one another, to produce nine 3×3 sample windows by selectively receiving the input of each processor, for determining said mask pattern corresponding to the data of a 3×3 sample window, and for outputting the predetermined data of the density and the direction of said image data.

10. The resolution enhancement apparatus of a laser printer according to claim 3, wherein said second processing means determines a group using a center pixel and peripheral eight pixel data of a 3×3 sample window.

11. The resolution enhancement apparatus of a laser printer according to claim 10, wherein said second processing means further determines a group for processing an acute angle using a bitmap pattern of each pixel in said 3×3 sample window and the predetermined data of the density and the direction output from said first processing means.

12. The resolution enhancement apparatus of a laser printer according to claim 11, wherein said second processing means further determines a group for altering the density of a pixel to support the toner-saving mode.

13. The resolution enhancement apparatus of a laser printer according to claim 12, wherein said second processing means further determines a group for altering a pixel to smoothen a curved portion which is not an inclined portion according to the density and direction of the pixel.

14. The resolution enhancement apparatus of a laser printer according to claim 13, wherein said second processing means further determines a group for altering a pixel to smoothen a curved portion which is an inclined portion according to the density and direction of the pixel.

15. The resolution enhancement apparatus of a laser printer according to claim 14, wherein said second processing means selects a density of a pixel according to a thickness flag when the toner-saving mode is performed.

16. The resolution enhancement apparatus of a laser printer according to claim 11, wherein, in order to discriminate acute and obtuse angles of one group, said second processing means determines that a candidate of an acute angle portion is an obtuse angle if direction information of pixels is different from a proceeding direction of the candidate and that the candidate is an acute angle if the direction information of pixels is the same as the proceeding direction of the candidate.

17. The resolution enhancement apparatus of a laser printer according to claim 1, wherein said sample window includes 7×7 pixel data when the value of M is seven.

18. The resolution enhancement apparatus of a laser printer according to claim 1, wherein said sample window includes 9×9 pixel data when the value of M is nine.

19. The resolution enhancement apparatus of a laser printer according to claim 1, wherein said signal modulation means discriminates 8-mode and 4-mode operation according to system drive capability and sets a mode according to system speed, to enable the resolution enhancement apparatus to be applied to various printers.

20. A resolution enhancement method of a laser printer, comprising the steps of:

sequentially storing in a memory input image data in a sequential scanning method, rearranging a scanning line order and generating an M×M sample window, M being an integer;

first processing the input image data to produce $(M-2)^2$ 3×3 sample windows using the M×M sample window, determining which mask pattern among a plurality of mask patterns is coincident with each of the produced 3×3 sample windows, and generating predetermined data with respect to direction and density of the image data according to the mask pattern;

second processing the predetermined data of the direction and density of the image data output from the first processing step to determine to which group among a plurality of groups the image data belongs, and altering the image data into predetermined image data corresponding to the group to output altered data for at least one of supporting a toner-saving mode and smoothing the image data; and modulating the data output from said second processing step into a predetermined pattern and outputting a modulated pattern.

21. The resolution enhancement method of a laser printer according to claim 20, wherein said sequentially storing step comprises the steps of:

storing received input image data; and reading the image data stored in said memory and generating the M×M sample window.

22. The resolution enhancement method of a laser printer according to claim 20, wherein said sample window includes 5×5 pixel data when the value of M is five.

23. The resolution enhancement method of a laser printer according to claim 22, wherein said sequentially storing step comprises the steps of:

converting received serial input data into parallel output data;

storing data supplied from said serial-to-parallel converting step;

storing the data of said serial-to-parallel converting step in a row line form so as to have a 5×8 arrangement;

rearranging an arrangement sequence of the 5×8 arrangement; and storing the rearranged data so as to have a 5×5 arrangement.

24. The resolution enhancement method of a laser printer according to claim 23, further comprising the step of demultiplexing parallel-converted input data.

25. The resolution enhancement method of a laser printer according to claim 22, wherein said sequentially storing step comprises the substeps of:

converting received serial input data into parallel output data;

storing 8-bit data supplied from said converting substep;

expanding stored 8-bit data into 16-bit data and storing the expanded data;

rearranging an arrangement sequence of the 16-bit data; and storing rearranged data so as to have a 5×5 arrangement.

26. The resolution enhancement method of a laser printer according to claim 25, wherein a read clock frequency of an 8-bit register and a load clock frequency of a 16-bit register are two times a write clock frequency of the 8-bit register.

27. The resolution enhancement method of a laser printer according to claim 22, wherein said first processing step comprises the steps of receiving 5×5 sample window data and processing each 5×5 sample window simultaneously, independently and in parallel with one another, producing nine 3×3 sample windows, and determining said mask pattern corresponding to the data of a 3×3 sample window and outputting data of the density and direction of said image data.

28. The resolution enhancement method of a laser printer according to claim 22, wherein said second processing step determines a group using a center pixel and peripheral eight pixel data of a 3×3 sample window.

29. The resolution enhancement method of a laser printer according to claim 28, wherein said second processing step further determines a group for processing an acute angle using a bitmap pattern of each pixel in a 3×3 sample window and the predetermined data of the density and direction output from said first processing step.

30. The resolution enhancement method of a laser printer according to claim 29, wherein said second processing step further determines a group for altering the density of a pixel to support the toner-saving mode.

31. The resolution enhancement method of a laser printer according to claim 30, wherein said second processing step further determines a group for altering a pixel to smoothen a curved portion which is not an inclined portion according to the density and direction of the pixel.

32. The resolution enhancement method of a laser printer according to claim 31, wherein said second processing step further determines a group for altering a pixel to smoothen a curved portion which is an inclined portion according to the density and direction of the pixel.

33. The resolution enhancement method of a laser printer according to claim 32, wherein said second processing step further determines a group for smoothing a font having three staircases by receiving the predetermined data of the first processing step, in which a 100% pixel is modified into a 0% pixel and a 0% pixel is modified into a 100% pixel to smoothen the image data.

34. The resolution enhancement method of a laser printer according to claim 33, wherein said second processing step further determines a group for correcting a graphic pattern to represent a continuous groove shape.

35. The resolution enhancement method of a laser printer according to claim 34, wherein said second processing step further determines a group where a pixel modified into CC 50% in a result of edge processing in the first processing-step is modified into one of a top/bottom and a right/left 50% pixel to smoothly connect an external edge curve.

36. The resolution enhancement method of a laser printer according to claim 35, wherein said second processing step further determines a group representing portions to be sharply indicated in a case of a two-step dot pattern.

37. The resolution enhancement method of a laser printer according to claim 36, wherein said second processing step further determines a group for adding one of a center-left and a center-right 25% pixel to a center of a three-step dot pattern to remove a one-step dot pattern in the second processing step since the three-step dot pattern is modified into the one-step dot pattern to process the three-step dot pattern.

38. The resolution enhancement method of a laser printer according to claim 37, wherein said second processing step selects a density of a pixel according to a thickness flag when the toner-saving mode is performed.

39. The resolution enhancement method of a laser printer according to claim 38, wherein, in order to discriminate acute and obtuse angles of one group, said second processing step determines that a candidate of an acute angle portion is an obtuse angle if direction information of pixels is different from a proceeding direction of the candidate and that the candidate is an acute angle if direction information of pixels is the same as the proceeding direction of the candidate.

40. The resolution enhancement method of a laser printer according to claim 20, wherein said sample window includes 7×7 pixel data when the value of M is seven.

41. The resolution enhancement method of a laser printer according to claim 20, wherein said sample window includes 9×9 pixel data when the value of M is nine.

42. The resolution enhancement method of a laser printer according to claim 20, wherein said step of sequentially storing comprises the steps of storing one row of data four times each.

43. The resolution enhancement method of a laser printer according to claim 20, wherein said modulating step discriminates 8-mode and 4-mode operation according to system drive capability and sets a mode according to system speed, to enable resolution enhancement to be applied to various printers.

* * * * *